(12) United States Patent
Brenden et al.

(10) Patent No.: US 12,528,655 B1
(45) Date of Patent: *Jan. 20, 2026

(54) AGGREGATE TRANSFERRING SYSTEM

(71) Applicants: Jason Brenden, Elk Point, SD (US);
Tyler Dewitt, Vermillion, SD (US)

(72) Inventors: Jason Brenden, Elk Point, SD (US);
Tyler Dewitt, Vermillion, SD (US)

(73) Assignee: Masaba, Inc., Vermillion, SD (US)

( * ) Notice: Subject to any disclaimer, the term of this patent is extended or adjusted under 35 U.S.C. 154(b) by 549 days.

This patent is subject to a terminal disclaimer.

(21) Appl. No.: 17/550,073

(22) Filed: Dec. 14, 2021

Related U.S. Application Data

(60) Provisional application No. 63/223,124, filed on Jul. 19, 2021.

(51) Int. Cl.
*B65G 67/08* (2006.01)
(52) U.S. Cl.
CPC ........ *B65G 67/08* (2013.01); *B65G 2201/042* (2013.01)
(58) Field of Classification Search
CPC .... B65G 21/14; B65G 41/002; B65G 41/008; B65G 17/126
See application file for complete search history.

(56) References Cited

U.S. PATENT DOCUMENTS

| | | | |
|---|---|---|---|
| 2,980,222 A | 4/1961 | Crosby | |
| 3,090,501 A | 5/1963 | Auld | |
| 3,545,599 A | 12/1970 | Smith | |
| 3,687,276 A * | 8/1972 | Pelletier | B65G 41/002 198/588 |
| 3,938,673 A | 2/1976 | Perry, Jr. | |
| 3,998,436 A | 12/1976 | Allen | |
| RE29,110 E * | 1/1977 | Oury | B65G 21/14 198/588 |
| 4,135,614 A | 1/1979 | Penterman | |
| 4,306,364 A * | 12/1981 | Ikeda | E02F 1/00 37/195 |

(Continued)

OTHER PUBLICATIONS

Petition for Inter Partes Review of U.S. Pat. No. 11,780,689; Case No. IPR2024-01179; 123 pages; filed Jul. 19, 2024.

(Continued)

*Primary Examiner* — Jonathan Snelting
(74) *Attorney, Agent, or Firm* — Woods, Fuller, Shultz & Smith, P.C.; Jeffrey A. Proehl

(57) ABSTRACT

An aggregate transferring apparatus for elevating aggregate may include a base assembly with a base frame, an unloader structure on the base frame, and a base conveyor on the base frame positioned to receive aggregate from a vehicle positioned on the unloader structure. The apparatus may also include an aggregate elevating assembly with a deployable frame mounted on the base frame and being movable between storage and deploy positions, and an elevating conveyor for receiving aggregate from the base conveyor and conveying the aggregate upwardly on the deployable frame. The apparatus may further include a conveyor extension assembly for conveying aggregate horizontally outward from the elevating assembly. The extension assembly may include an extension conveyor movable between lowered and raised positions and being articulated with an inboard and outboard segments.

22 Claims, 20 Drawing Sheets

(56) References Cited

U.S. PATENT DOCUMENTS

| | | | |
|---|---|---|---|
| 4,789,056 | A | 12/1988 | Bourbeau |
| 6,378,686 | B1* | 4/2002 | Mayer ................. E04G 21/0409 |
| | | | 198/589 |
| 7,090,066 | B2 | 8/2006 | Kirsch |
| 8,684,161 | B2 | 4/2014 | Gausman |
| 8,926,252 | B2 | 1/2015 | McIver |
| 8,955,264 | B2 | 2/2015 | Edwards |
| 9,428,348 | B2 | 8/2016 | Teichrob |
| 9,499,335 | B2 | 11/2016 | McIver |
| 9,616,799 | B1 | 4/2017 | Smith |
| 9,663,303 | B2 | 5/2017 | Waldner |
| 10,053,308 | B2 | 8/2018 | Toews |
| 10,065,814 | B2* | 9/2018 | Herman ............... B65G 17/126 |
| 10,300,830 | B2 | 5/2019 | McIver |
| 10,315,850 | B2* | 6/2019 | Campbell ............ B65G 41/006 |
| 10,399,785 | B1 | 9/2019 | Fike |
| 10,406,962 | B2 | 9/2019 | Hughes |
| 10,414,599 | B2 | 9/2019 | McCloskey |
| 10,556,752 | B1 | 2/2020 | McCloskey |
| 10,577,198 | B2 | 3/2020 | Friesen |
| 10,625,654 | B2 | 4/2020 | Hughes |
| 10,633,174 | B2* | 4/2020 | Pham .................... B65D 88/54 |
| 10,836,568 | B2 | 11/2020 | Managan |
| 11,185,900 | B2 | 11/2021 | Smith |
| 11,691,831 | B2* | 7/2023 | Sleeman ............... B65G 47/58 |
| | | | 198/538 |
| 11,745,952 | B1* | 9/2023 | Bynum ................. B65G 21/12 |
| | | | 198/313 |
| 11,780,689 | B1* | 10/2023 | Brenden .............. B65G 41/008 |
| | | | 414/398 |
| 11,858,760 | B1 | 1/2024 | Weinstein |
| 2005/0123385 | A1* | 6/2005 | Kirsch ................... B65G 47/18 |
| | | | 414/575 |
| 2007/0029170 | A1 | 2/2007 | Anagnost |
| 2012/0241290 | A1 | 9/2012 | Gausman |
| 2013/0118862 | A1* | 5/2013 | Stewart ................ B65G 41/002 |
| | | | 198/300 |
| 2014/0318040 | A1 | 10/2014 | Edwards |
| 2015/0086308 | A1 | 3/2015 | McIver |
| 2016/0258267 | A1 | 9/2016 | Payne |
| 2017/0021318 | A1 | 1/2017 | McIver |
| 2017/0313499 | A1 | 11/2017 | Hughes |
| 2018/0297503 | A1 | 10/2018 | Hughes |
| 2019/0016536 | A1 | 1/2019 | Campbell |
| 2019/0100391 | A1 | 4/2019 | Managan |
| 2019/0248578 | A1 | 8/2019 | Managan |
| 2020/0231378 | A1 | 7/2020 | Lambert |
| 2021/0062632 | A1 | 3/2021 | Lambert |
| 2021/0214153 | A1 | 7/2021 | Lambert |
| 2021/0354910 | A1 | 11/2021 | Grimes |
| 2022/0324660 | A1 | 10/2022 | Lambert |

OTHER PUBLICATIONS

Declaration of Dr. Robert A. Durham; 283 pages; dated Jul. 19, 2024.

Belt Conveyor-Based Loading Systems, https://web.archive.org/web/20160819111857/http:/mcschroeder.com/wp-content/uploads/2012/09/Product-Spec-Sheet-Belt-EconoLoader.pdf (Aug. 19, 2016 ("Dynatek") 3 pages.

EconoLoader Air Slide Conveyor Design, https://web.archive.org/web/20160819062313/http://mcschroeder.com/wp-content/uploads/2012/09/Product-Spec-Sheet-Air-Slide-EconoLoader.pdf, 2 pages.

EconoLoader Screw Conveyor Design, https://web.archive.org/web/20160819112209/http://mcschroeder.com/wp-content/uploads/2012/09/Product-Spec-Sheet-Auger-EconoLoader.pdf, 2 pages.

EconoLoader Drag Conveyor Design, https://web.archive.org/web/20160819173056/http://mceschroeder.com/wp-content/uploads/2012/09/Product-Spec-Sheet-Drag-EconoLoader1.pdf.

Kania, L., et al. (2012). "A Catalogue Capacity of Slewing Bearings". Mechanism and Machine Theory, 58, (29-45). https://doi.org/10.1016/j.mechmachtheory.2012.07.012, 17 pages.

Slewing bearings, https://web.archive.org/web/20200402104046/https://www.skf.com/group/products/slewing-bearings, 3 pages.

U.S. Department of Labor, OSHA, "Hydraulic Fracturing and Flowback Hazards Other than Respirable Silica" (OSHA 3763-12 2014) ("OSHA 3763"), available at: https://www.osha.gov/sites/default/files/publications/OSHA3763.pdf, 24 pages.

Decision Granting Institution of Inter Partes Review of U.S. Pat. No. 11,780,689; Case No. IPR2024-01179; 10 pages; dated Jan. 27, 2025.

Patent Owner's Response under 37 C.F.R. 42.120, Case No. IPR2024-01179, 84 pages, dated Apr. 28, 2025.

E-mail from Jeremy Weinstein to Kelly Price, Fw: Dpr Aug. 30, 21 (Aug. 31, 2021 8:26 AM); 2 pages.

E-mail from Dan Brinkman to Jeremy Weinstein at al., RE: Incline conveyor spec sheet (Dec. 8, 2020 11:46 AM); 2 pages.

LeBlansch Vortex Dust Free Loading Spouts & Equipment, 8 pages, https://www.leblansch-vortexvalves.com/wpcontent/uploads/2014/10/Loading-Solutions-beladings-balgenbrochure-vortex-valves-LeBlansch.pdf.

Dust Control and Loading Systems, Inc. (DCL), Product Line Brochure, 33 pages, https://dclinc.com/wpcontent/uploads/2019/10/dclinc_fullline_brochure_english_sm.pdf.

Midwest International Articuloader II, 5 pages, https://midwestmagic.com/Resources/Files/tech-specs/Positioners-Articuloader-tech-spec.pdf.

"Liebherr MK 88 Plus Mobile Tower Crane Erects Asphalt Recycling Plant In The Netherlands", 5 pages, available at: https://www.cranetrader.com/blog/crane-and-lifting-equipmentnews/2020/12/liebherr-mk-88-plus-mobile-tower-crane-erectsasphalt-recycling-plant-in-the-netherlands.

Dictionary of Mechanical Engineering, G. H. F. Nayler, 1999, ISBN 10:81-7224-789-3, 3 pages.

Illustrated Dictionary of Mechanical Engineering, Griffith Pearson, 2015, ISBN 81-89093-48-7, 3 pages.

"Power Conveyor or Gravity Conveyor?", 6 pages, available at: https://www.ashlandconveyor.com/pages/power-vsgravity?srsltid=AfmBOopTf-E4GchqwUxOzcnOhANImtl9vtukvFiPL4D_NGfKalVLgXJU.

"Belt Installation, Tracking, and Maintenance Guide", 11 pages, LEWCO, Inc., 2018.

"Automatic Vehicle Leveling System", 9 pages, download date Jul. 21, 25, available at: https://www.gesmuhendislik.com/works/automatic-vehicle-levelingsystem/.

"CST Storage Frac Sand Storage Solutions", 8 pages, available at: https://www.cstindustries.com/wp-content/uploads/2019/01/Frac-Sand-Storage-Solutions-Brochure_web-version.pdf.

"Don't Be Thrown a Curve: Understanding Belted Conveyor vs. Live Roller Conveyor in Curve Applications", 6 pages, download date Jul. 21, 25, available at: https://blog.hytrol.com/dont-be-thrown-a-curve-understandingbelted-conveyor-vs-live-roller-conveyor-in-curve-applications/.

"How America's 'most reckless' billionaire created the fracking boom", 12 pages, download date Jul. 21, 25, available at: https://www.theguardian.com/news/2018/Aug.30/how-the-usfracking-boom-almost-fell-apart.

"Gooseneck vs 5th Wheel", 7 pages, download date Jul. 21, 25, available at: https://web.archive.org/web/20201203233432/https://www.curtmfg.com/5th-wheel/gooseneck-adapters/learn-more.

"Holland FW35", 4 pages, download date Jul. 21, 25, available at: https://safholland.com/US/en/products/holland-fw35-sd?tx_productcataloguesaf_productcatalogue%BpreviousCategory%5D=35&cHash=04537b6b9686f2eb6129cdc9c895b3c7.

Engineering Manual—Innovative Belt & Chain Solutions for Every Industry & Application, 144 pages.

"A Review on the Angle of Repose of Granular Material", by Al-Hashemi et al., Powder Technology, pp. 397-417, Feb. 27, 2018 (https://www.sciencedirect.com/science/article/pii/S0032591018301153 [https://doi.org/10.1016/j.powtec.2018.02.003]).

"Frac Sand Storage and Handling System", 12 pages, copyright 2010, available at: https://www.tankconnection.com/assets/pdf/frac-

(56) References Cited

OTHER PUBLICATIONS sand-system.pdf [https://web.archive.org/web/20170301134047/http://www.tankconnection.com:80/assets/pdf/frac-sand-system.pdf].

Patent Owner's Sur-Reply; Case No. IPR2024-01179; 36 pages; filed Sep. 30, 2025.

Photograph Exhibit to Sep. 17, 2025, Deposition of Jeremy Weinstein; 1 page.

Transcript of Sep. 4, 2025, Deposition of Dr. Robert Durham (with errata sheet); 121 pages.

Transcript of Sep. 10, 2025, Deposition of David Smith (with errata sheet); 129 pages.

Transcript of Sep. 17, 2025, Deposition of Jeremy Weinstein; 125 pages.

Petitioners' Reply to Patent Owner's Response, Case No. IPR2024-01179; 42 pages; filed Jul. 28, 2025.

U.S. Pat. No. 8,926,252 to McIver et al. as Annotated During Mar. 26, 2025 Deposition of Dr. Robert Durham, 29 pages.

Figures 6 and 7 of U.S. Pat. No. 9,663,303 to Waldner et al. as Annotated During Mar. 26, 2025 Deposition of Dr. Robert Durham, 2 pages.

Transcript of Mar. 26, 2025 Deposition of Dr. Robert Durham, 158 pages.

Expert Declaration of Travis A. Anderson (dated Apr. 28, 2025), 130 pages.

Declaration of Dan Brinkman (dated Apr. 17, 2025), 29 pages.

Declaration of Mike Stanton (dated Apr. 27, 2025), 15 pages.

Declaration of Aaron Shatto (dated Apr. 8, 2025), 8 pages.

Solaris Oilfield Infrastructure Investor Presentation Sep. 2021 (retrieved at https://ir.solarisoilfield.com/~/media/Files/S/Solaris-IR/reports-and-presentations/soi-investor-presentation-2021-09-15.pdf), 20 pages.

Solaris Products website; download date Apr. 23, 25; 3 pages, https://web.archive.org/web/20211130155708/https:/www.solarisoilfield.com/products.

Solaris Top Fill Sand Loading System website; download date Apr. 23, 25, 5 pages, https://web.archive.org/web/20211130143508/https:/www.solarisoilfield.com/products/top-fill-sand-loading-system.

Solaris Oilfield Infrastructure Investor Presentation Dec. 2021 (retrieved at https://ir.solarisoilfield.com/~/media/Files/S/Solaris-IR/reports-and-presentations/soi-investor-presentation-dec-2021-for-website.pdf); 23 pages.

Screenshot from Solaris Top Fill Sand Loading System Animation at https://vimeo.com/673402149 at 0:01.

Screenshot from Solaris Top Fill Sand Loading System Animation at https://vimeo.com/673402149 at 0:04.

Screenshot from Solaris Top Fill Sand Loading System Animation at https://vimeo.com/673402149 at 0:11.

Screenshot from Solaris Top Fill Sand Loading System Animation at https://vimeo.com/673402149 at 0:12.

Solaris Oilfield Infrastructure Top Fill Sand Loading System Tech Specs, 4 pages.

Solaris Oilfield Infrastructure Investor Presentation Aug. 2023 (retrieved at https://ir.solarisoilfield.com/~/media/Files/S/Solaris-IR/reports-and-presentations/soi-investor-presentation-august-2023.pdf), 23 pages.

CTRM Center, "No., its not 'Fracking" at https://www.ctrmcenter.com/blog/fracking/ ; 5 pages; download date Apr. 23, 2025.

Drillers.com, "Fracking Vs Fracing—The End of the Debate?" at https://drillers.com/fracking-vs-fracing-end-debate ; 5 pages; download date Apr. 23, 2025.

Association of Equipment Manufacturers, "Construction Aggregates 101: What They Are (And Why They Matter)" ; 3 pages; download date Apr. 23, 2025; at https://web.archive.org/web/20210713195729/https://www.aem.org/news/construction-aggregates-101-what-they-are-and-why-they-matter.

American Concrete Institute, "What is aggregate?" at https://www.concrete.org/frequentlyaskedquestions.aspx?faqid=704.

Dexter Axle Company, Operation Maintenance Service Manual: Heavy Duty Suspension System at https://www.dextergroup.com/user_area/content_media/raw/heavy-duty-suspension-system-lit-012-00.pdf.

Amended Complaint and Jury Demand, *Masaba, Inc.* v. *Solaris Oilfield Site Services Operating, LLC*, Civil Action 2:23-CV-00236 (D. Wyo. Jun. 14, 2024).

CV of Petitioners' Expert, Dr. Robert A. Durham; 12 pages.

File History of '689 Patent, 261 pages.

Claim Listing from '689 Patent, 16 pages.

Affidavit of Nathanial E. Frank-White regarding Dynatek 44 pages; dated Jun. 6, 2024.

U.S. Department of Labor, OSHA, "Worker Exposure to Silica during Hydraulic Fracturing", 7 pages; available at: https://www.osha.gov/sites/default/files/publications/hydraulic_frac_hazard_alert.pdf.

NOV SandBank Proppant Silo System, 10 pages; https://www.nov.com/products/sandbank-proppant-silo-system (from the Jun. 11, 2025 Deposition of Mr. Travis A. Anderson); download date Jun. 9, 2025.

ForeSite Logistics—The Prop Tower, 4 pages; https://www.foresitelogistics.com/projects/prop-tower/ (from the Jun. 11, 2025 Deposition of Mr. Travis A. Anderson); download date Jun. 6, 2025.

ForeSite Logistics, Services Guide (from the Jun. 11, 2025 Deposition of Mr. Travis A. Anderson); 8 pages.

Hand-drawn Diagram from the Jun. 11, 2025 Deposition of Mr. Travis A. Anderson, 1 page.

'689 Patent, fig. 3 with annotations (from the Jun. 11, 2025 Deposition of Mr. Travis A. Anderson); 1 page.

E-mail from Jeremy Weinstein to Mike Stanton, Revised Beltwall Spec (Oct. 28, 2020 2:28 PM) (from the Jun. 18, 2025 Deposition of Mr. Dan Brinkman); 1 page.

Declaration of Dan Brinkman with Annotations (from the Jun. 18, 2025 Deposition of Mr. Dan Brinkman); 25 pages.

Masaba000001-04, E-mail from Andrew Wells to Mike Stanton et al. (Aug. 13, 2020 1:58 PM) (from the Jun. 24, 2025 Deposition of Mr. Mike Stanton); 4 pages.

Masaba000005, e-mail attachment "S20124 - Solaris Layout. pdf" (from the Jun. 24, 2025 Deposition of Mr. Mike Stanton); 1 page.

E-mail from Mike Stanton to Jeremy Weinstein, Anchor Incline Silo Conveyor (Aug. 13, 2020 3:59 PM) (from the Jun. 24, 2025 Deposition of Mr. Mike Stanton); 2 pages.

E-mail from Mike Stanton to Jeremy Weinstein, Anchor BE Concept (Jan. 12, 2021 4:01 PM) (from the Jun. 24, 2025 Deposition of Mr. Mike Stanton); 4 pages.

E-mail from Jeremy Weinstein to Mike Stanton et al., Re: Be System Quote (Jan. 20, 2021 4:24 PM) (from the Jun. 24, 2025 Deposition of Mr. Mike Stanton); 5 pages.

E-mail from Mike Stanton to Jeremy Weinstein, RE: Weekly BE Project Update (Jun. 8, 2021 8:36 AM) (from the Jun. 24, 2025 Deposition of Mr. Mike Stanton); 3 pages.

Supplement Expert Declaration of Dr. Robert Durham in Support of Petitioners' Petition; 50 pages; dated Jul. 25, 2025.

Expert Declaration of David Smith in Support of Petitioners' Petition; 77 pages; dated Jul. 24, 2025.

Declaration of Jeremy Weinstein in Support of Petitioners' Petition; 21 pages; dated Jul. 24, 2025.

Transcript of Jun. 18, 2025 Deposition of Mr. Dan Brinkman; 207 pages.

E-mail from Mike Stanton to Jeremy Weinstein, FW: Anchor Silo—Conveyor (Jul. 14, 2020 8:02 PM) 11 pages.

E-mail from Mike Stanton to Jeremy Weinstein, RE: Conveyor Meeting (Oct. 5, 2020 10:21 AM); 5 pages.

E-mail from Jeremy Weinstein to Mike Stanton, distribution ideas (Dec. 11, 2020 9:32 AM) 2 pages.

E-mail from Jason Brenden to Jeremy Weinstein et al., Solaris—Bucket Elevator Concept—Loading Areas (Jan. 19, 2021 2:50 PM) 4 pages.

\* cited by examiner

AGGREGATE TRANSFERRING SYSTEM

REFERENCE TO RELATED APPLICATIONS

This application claims the benefit of the priority of U.S. Provisional Patent Application No. 63/223,124, filed Jul. 19, 2021, which is hereby incorporated by reference in its entirety.

BACKGROUND

Field

The present disclosure relates to material handling apparatus and more particularly pertains to a new aggregate transferring system for receiving aggregate from a vehicle and elevating the aggregate to a higher vertical level for deposit into, for example, a silo.

SUMMARY

The present disclosure relates to an aggregate transferring apparatus for elevating and transferring aggregate. The apparatus may comprise a base assembly for receiving aggregate to be conveyed by the transferring apparatus. The base assembly may include a base frame being elongated along a longitudinal axis and having a leading end and a trailing end, an unloader structure mounted on the base frame to receive aggregate from a vehicle at least partially positioned over the base frame, and a base conveyor mounted on the base frame and extending along a longitudinal portion of the base frame between the leading and trailing ends of the base frame. A portion of the base conveyor may be positioned adjacent to the unloader structure to receive aggregate from the vehicle positioned over the base frame. The aggregate transferring apparatus may further comprise an aggregate elevating assembly for elevating aggregate from the base assembly. The aggregate elevating assembly may include a deployable frame mounted on the base frame and being movable between a storage position and a deploy position, with the storage position corresponding to a transport configuration of the apparatus and the deploy position corresponding to an operational configuration of the apparatus. Further, the deployable frame may be elongated with a base end and a free end. The aggregate elevating assembly may further include an elevating conveyor configured to receive aggregate from the base conveyor and convey the aggregate upwardly from the base assembly toward the free end of the deployable frame. The aggregate transferring apparatus may also comprise a conveyor extension assembly for conveying aggregate to locations horizontally outward from the aggregate elevating assembly. The conveyor extension assembly may include an extension conveyor for moving aggregate from an inlet of the extension conveyor to an outlet of the extension conveyor at a location outward from the aggregate elevating assembly. The extension conveyor may be movable with respect to the aggregate elevating assembly between a lowered position corresponding to the transport configuration of the apparatus and a raised position corresponding to the operational configuration of the apparatus. The lowered position may be characterized by the extension conveyor being positioned adjacent to the deployable frame of the aggregate elevating assembly, and the raised position may be characterized by the extension conveyor being positioned generally away from the deployable frame of the aggregate elevating assembly. The extension conveyor may be articulated between the inlet and outlet with an inboard segment and an outboard segment. The inboard segment may be pivotally connected to the deployable frame of the aggregate elevating assembly by an inboard pivot, and the outboard segment may be pivotally connected to the inboard segment by an outboard pivot.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1A:
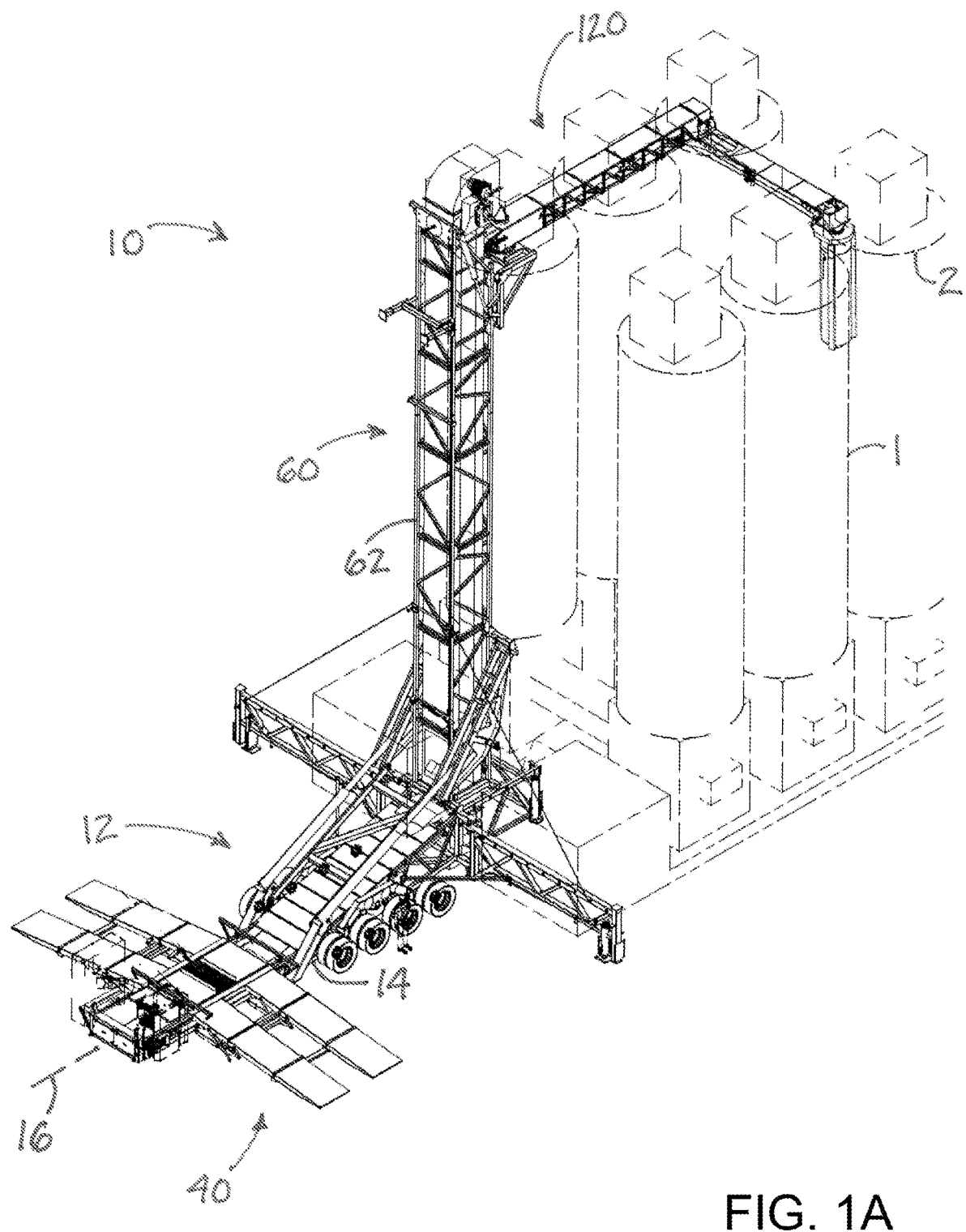
FIG. 1A is a schematic perspective view of a new aggregate transferring system according to the present disclosure shown with respect to silos depicted in broken lines.
Figure 1B:
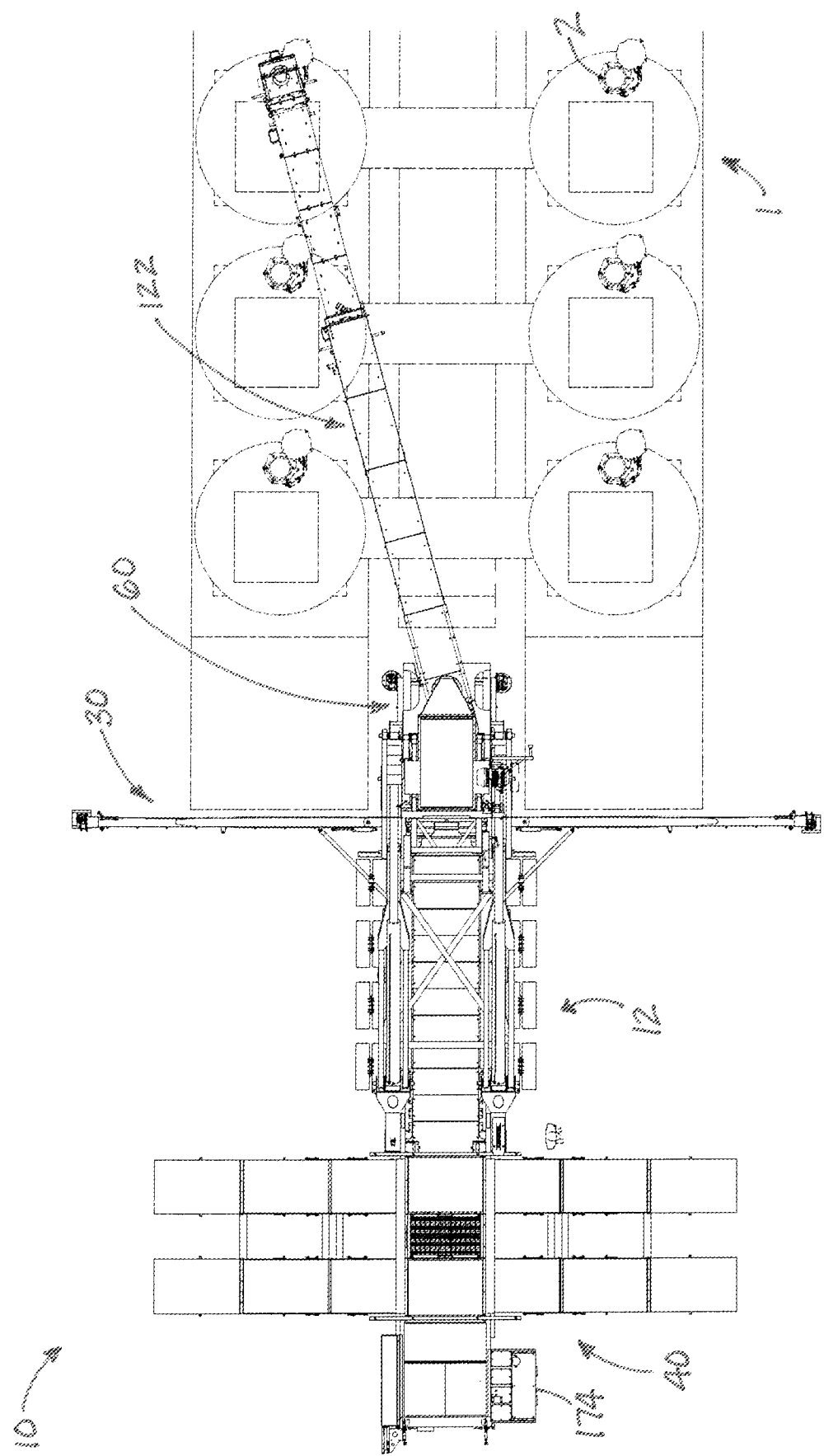
FIG. 1B is a schematic top view of a new aggregate transferring system according to the present disclosure shown with respect to silos depicted in broken lines.
Figure 2A:
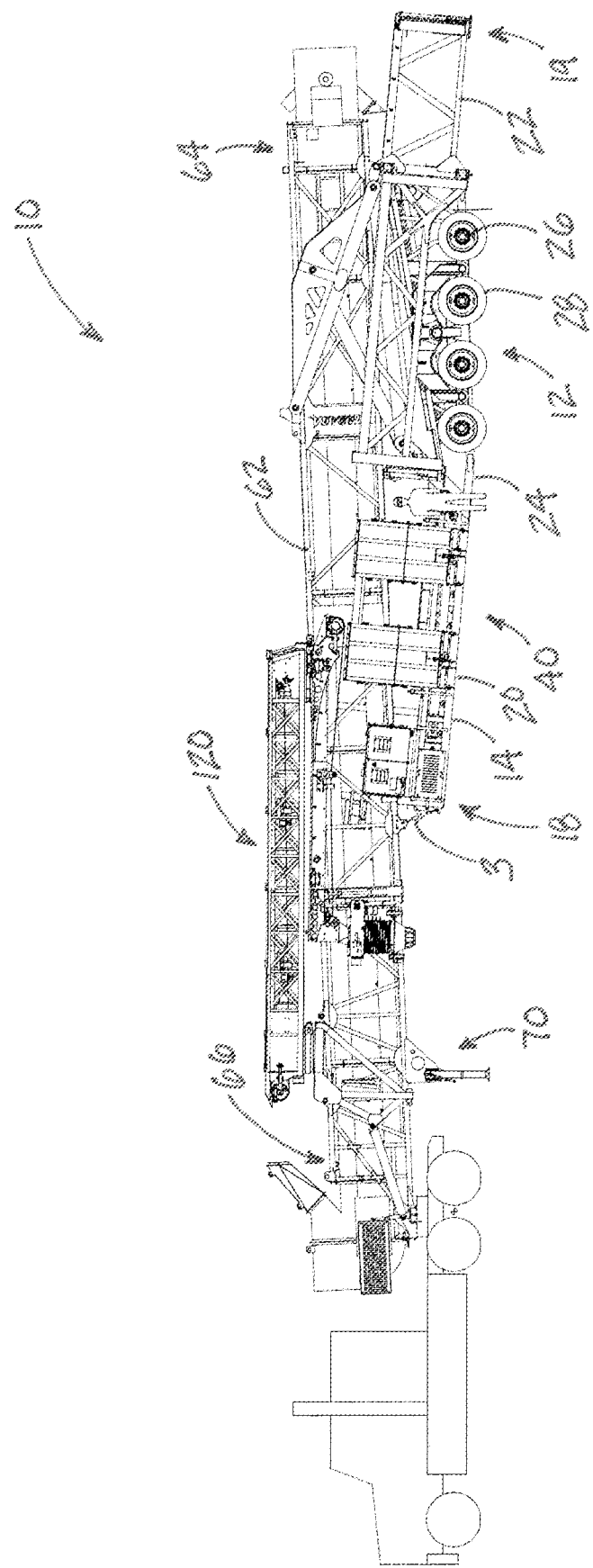
FIG. 2A is a schematic side view of the aggregate transfer apparatus shown in a transport or travel configuration and attached to a towing vehicle, according to an illustrative embodiment.
Figure 2B:
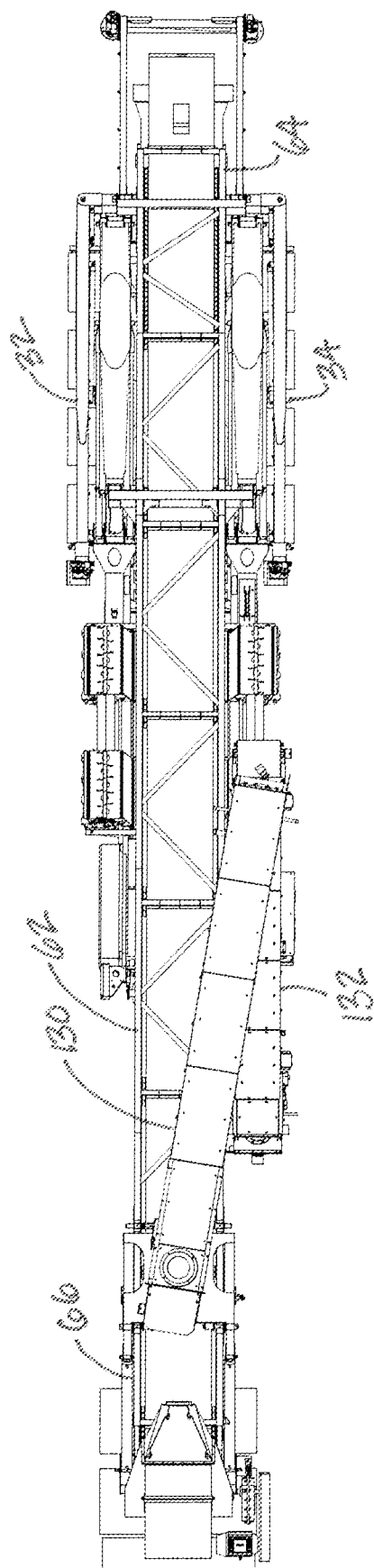
FIG. 2B is a schematic top view of the aggregate transfer apparatus in the travel configuration, according to an illustrative embodiment.
Figure 3:
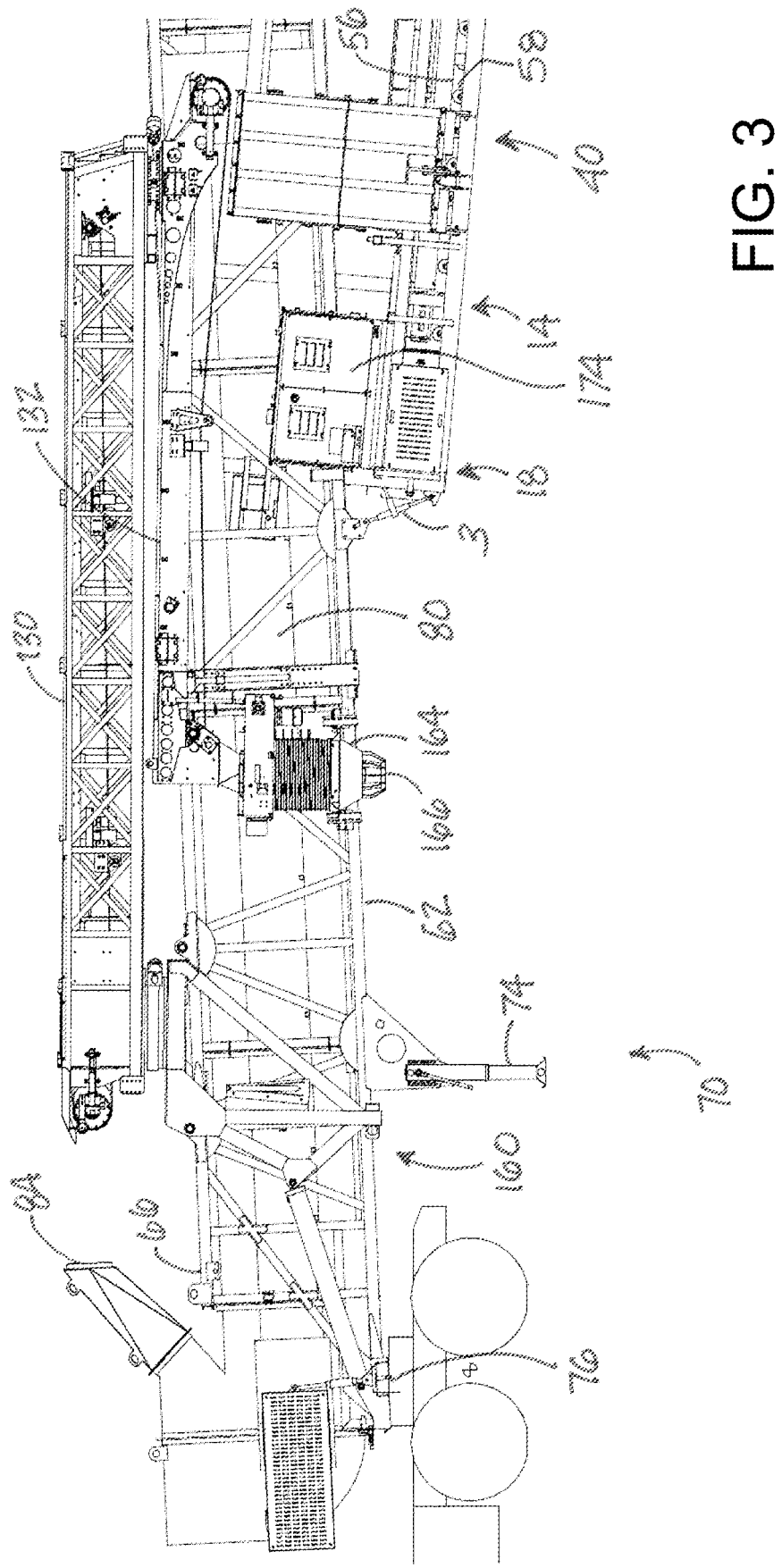
FIG. 3 is a schematic side view of a forward portion of the aggregate transfer apparatus in the travel configuration, according to an illustrative embodiment.
Figure 4:
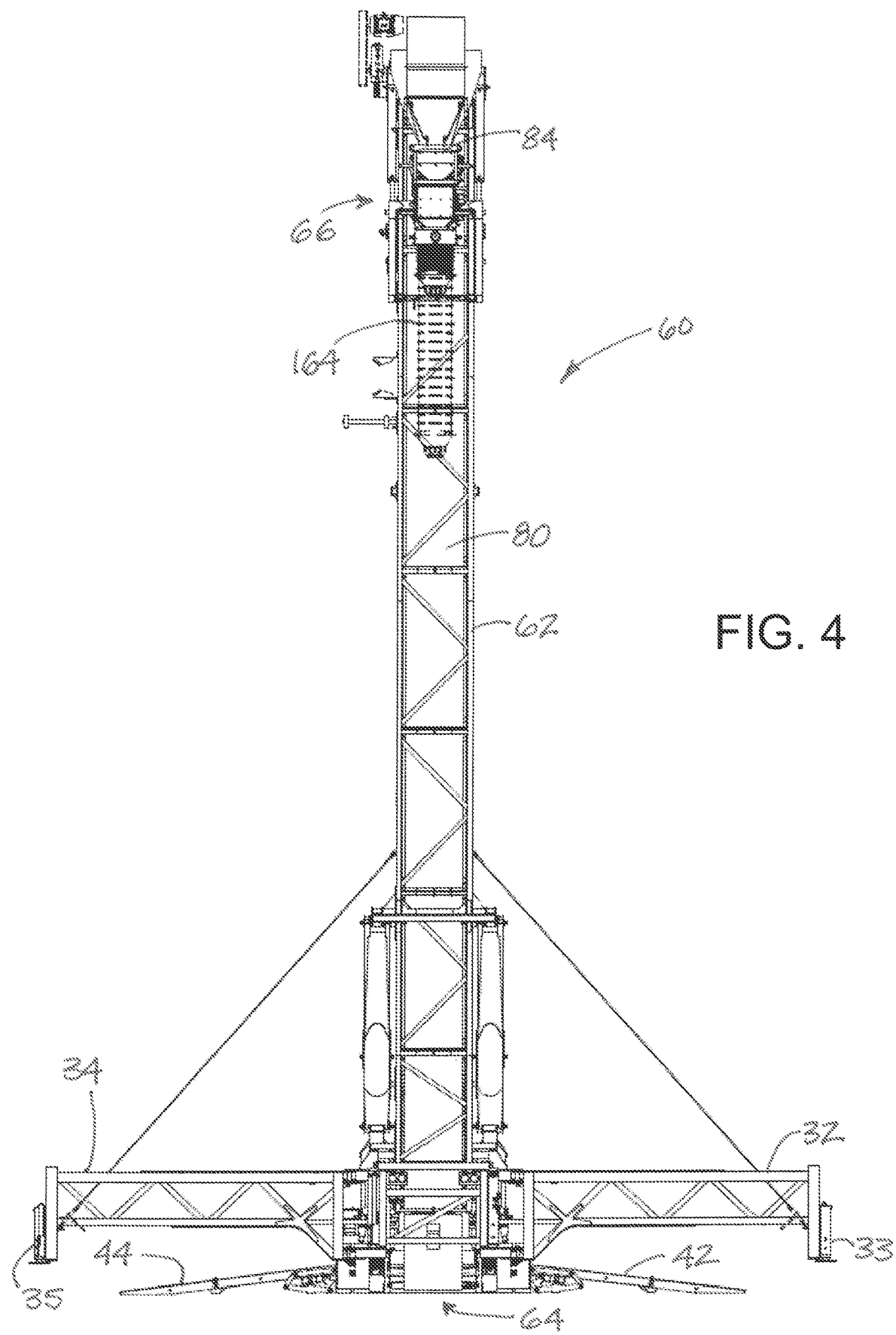
FIG. 4 is a schematic rear end view of the aggregate transfer apparatus in an operational configuration, according to an illustrative embodiment.

With reference now to the drawings, and in particular to FIGS. 1 through 9 thereof, a new aggregate transferring system embodying the principles and concepts of the disclosed subject matter will be described.

The applicants have recognized that an apparatus for transferring aggregate, such as from a vehicle to a storage silo, would be particularly advantageous if the apparatus had the capability to deploy itself at the location of transfer without the need for any significant assistance from other apparatus, such as cranes or telescopic handlers (e.g., "telehandlers"). The ability of the apparatus to "self deploy" can minimize the complexity of the deployment operation by eliminating any need to provide the additional apparatus at a work site, likely reducing the number of personnel involved in the deployment operation, as well as eliminating the need to coordinate the movements of the additional apparatus with respect to the aggregate transferring apparatus (as well as the dangers inherent with such coordination).

Moreover, the applicants have also recognized the advantages provided by an aggregate transfer apparatus which is highly integrated such that all of the major components of the apparatus are able to be transported as a unit between locations without elements being hauled by separate transport.

In one aspect, the disclosure relates to an aggregate transferring apparatus 10 for transferring aggregate, as will be illustratively described. The apparatus 10 is suitable for performing the transfer of aggregate from one location to another, such as, for example, from a vehicle carrying the aggregate to a silo 1 for storing the aggregate. Illustratively, the aggregate transferring apparatus 10 may be utilized for transferring an aggregate such as sand, and in some implementations the sand may be of the type utilized in the process of hydraulic fracturing in connection with subterranean petroleum drilling. The vehicle may comprise a truck suitable for carrying the aggregate, and dumping or otherwise dispensing the aggregate, such as a bottom dump trailer. The silo may be positioned on the ground surface and may be vertically elongated with a top elevated above the ground surface, and the top have a port 2 which may be open, or openable (and closable), to receive the aggregate into the interior of the silo. In some applications, more than one silo may be grouped together adjacent to each other, such as in a two silo wide by three silo length array.

The aggregate transferring apparatus 10 may have an operational configuration (see, e.g., FIGS. 1A, 1B, 4. 5D, 7A, 7D, and 8A through 8F) in which the apparatus is configured to receive the aggregate, and then transport or convey the aggregate to a position elevated above the ground surface so that the aggregate may be dispensed into a silo, such as through the open top of the silo. The aggregate transferring apparatus 10 may also have a transport or travel configuration (see, e.g., FIGS. 2A, 2B and 3) in which the apparatus is suitable to be moved from one location to another, such as by towing the apparatus over roads and highways. In general, in the operational configuration, the apparatus may be relatively extended and expanded, while in the transport configuration the apparatus may be relatively collapsed and compact to facilitate movements on roads.

In greater detail, the aggregate transferring apparatus 10 may include a base assembly 12 for receiving aggregate to be conveyed by the transferring apparatus and forming the portion of the apparatus 10 generally extending along and engaging the ground surface, particularly in the operational configuration. The base assembly 12 may comprise a base frame 14 which may be elongated along a longitudinal axis 16 of the frame 14 and the assembly 12. The base frame 14 has a leading end 18 and a trailing end 19, with the leading end being generally oriented toward the normal direction of movement of the apparatus 10 when the apparatus is being moved in the transport configuration. The frame 14 may have a leading portion 20 which includes the leading end 18 as well as the portion of the base frame adjacent to the leading end, a trailing portion 22 which includes the trailing end 19 as well as the portion of the base frame adjacent to the trailing end. The base frame 14 may also include a medial portion 24 which is positioned between the leading 20 and trailing 22 portions.

The base assembly 12 may also include at least one axle 26 which is mounted on the base frame 14, and a pair of wheels 28 which are mounted on opposite ends of the axle 26. Typically, to enhance the move ability of the apparatus 10 over highways, the base assembly will include a plurality of axles positioned along the base frame in the longitudinal direction of the base frame. Illustratively, the plurality of axles 26 and corresponding wheels 28 are located on the medial portion 24 of the base frame. In some embodiments, the axles are mounted on the base frame 14 utilizing one or more tandem walking beams, although other suspension structures may be utilized.

In some embodiments, the base assembly 12 may include an outrigger structure 30 mounted on the base frame 14 for enhancing the stability of the operational configuration of the apparatus 10, as well as the stability as the apparatus moves between the operational and transport configurations. The outrigger structure 30 may be positioned on the base frame 14 toward the trailing end 19, such as on the trailing portion 22 of the frame 14. The outrigger structure 30 may be movable with respect to the base frame 14, and may be movable between a stabilizing condition (see, e.g., FIGS. 1A, 1B and 4) and a non-stabilizing condition (see, e.g., FIGS. 2A, 2B and 3). In general, the non-stabilizing condition of the outrigger structure 30 may correspond to the transport configuration of the apparatus 10 while the stabilizing condition of the structure 30 may correspond to the operational configuration of the apparatus. The stabilizing condition of the outrigger structure 30 may also be utilized when the apparatus 10 is moving from the transport condition to the operational condition, and also when the apparatus 10 is moving from the operational condition to the transport condition.

In some greater detail, the outrigger structure 30 may include at least one outrigger arm 32 which is mounted on the base frame 14, and the outrigger arm maybe pivotable with respect to the base frame. The outrigger arm 32 may be oriented substantially perpendicular to the longitudinal axis 16 of the base frame in the stabilizing condition of the outrigger structure, and may be oriented substantially parallel to the longitudinal axis in the non-stabilizing condition of the outrigger structure. In some of the most preferable embodiments, a pair of the outrigger arms 32, 34 is utilized and each arm is pivotally mounted on the base frame. The pair of outrigger arms 32, 34 may extend in substantially opposite directions from each other in the stabilizing condition and the arms may extend substantially parallel to each other in the non-stabilizing condition. Further, the pair of outrigger arms 32, 34 may be positioned astride of the wheels 28 on the axles when the outrigger structure is in the non-stabilizing condition.

The outrigger structure 30 may further include at least one outrigger leg 33 that is configured to extend downwardly from one of the outrigger arms 32, 34 to contact the ground surface below the outrigger arm. The outrigger leg 33 may have an extended position in which the leg 33 is extended away from the outrigger arm toward the ground surface to contact the ground surface for providing stability to the apparatus 10. The outrigger leg 33 may also have a retracted position in which the leg 33 is retracted toward the outrigger arm and away from the ground surface. A pair of the outrigger legs 33 may be provided, with each outrigger leg being mounted on one of the outrigger arms 32, 34. The extended position of the outrigger legs 33 may correspond to the deployed mode of the apparatus 10 and the retracted position of the outrigger leg may correspond to the storage mode of the apparatus. An outrigger leg actuator 35 may be provided for each outrigger leg 33 to move the outrigger leg between the extended position and the retracted position, and the actuator 35 may be connected to the outrigger arm and the outrigger leg to act between the arm and leg.

Additionally, at least one stabilizing leg 36 may be provided that is extendable downwardly from the base frame 14 to contact the ground surface below the apparatus 10. The stabilizing leg 36 may have an extended position in which the leg 36 is extended away from the base frame 14 toward the ground surface to contact with the ground surface and a retracted position in which the leg 36 is retracted toward the base frame and away from the ground surface. A plurality of the stabilizing legs 36 may be utilized, and may include a pair of the stabilizing legs each being mounted on the base frame 14. The pair of stabilizing legs 36 may be located toward the trailing end 19 of the base frame, and may be laterally offset from a central longitudinal axis of the base frame, such as or locations between the outrigger legs 33 mounted on the outrigger arms 32, 34 (see, e.g., FIG. 4). The extended position of the stabilizing legs 36 may correspond to the deployed mode of the apparatus and the retracted position of the stabilizing legs may correspond to the storage mode of the apparatus, A stabilizing leg actuator 37 being configured to move the at least one stabilizing leg between the extended position in the retracted position, the stabilizing leg actuator acting between the base frame and the stabilizing leg, The base assembly 12 may further comprise an unloader structure 40 for receiving the aggregate from the vehicle carrying the aggregate to the apparatus 10. The unloader structure 40 may be mounted on the base frame 14, and may be positioned toward the leading end 18 of the frame 14 and on the leading portion 20 of the frame (but also may be spaced from the leading end of the frame). The unloader structure 40 may have a transport condition and an operational condition, with the transport condition generally corresponding to the transport configuration of the apparatus 10 and the operational condition generally corresponding to the operational configuration of the apparatus. The unloader structure 40 may include a pair of ramps 42, 44 mounted on the base frame 14, with each of the ramps being pivotable with respect to the base frame. In the operational condition, the ramps 42, 44 may extend laterally from the base frame 14 in substantially opposite directions in the operational condition, and may be oriented substantially horizontally for contacting the ground surface. In the transport condition, the ramps may be oriented substantially parallel with respect to each other, and may extend substantially vertically upwardly from the base frame 14. Illustratively, each of the ramps 42, 44 may comprise a pair of ramp portions 46, 47 positioned adjacent to each other, although a ramp comprised of a single ramp portion may also be utilized. Each of the ramps 42, 44, and ramp portions 46, 47 if utilized, may have a position corresponding to the transport condition of the unloader structure 40 and also have a position corresponding to the operational condition of the unloader structure. At least one ramp actuator 45 may be provided which is configured to move at least one of the ramps between the position corresponding to the transport condition and the position corresponding to the operational condition. Typically, a plurality of the ramp actuators 45 may act on the ramps 42, 44 (and ramp portions 46, 47 if utilized) to move the ramps, and/or the portions of the ramps, between the positions corresponding to the transport and operational conditions of the unloader structure.

The unloader structure 40 may further include a grate 48 mounted on the base frame 14 that may be substantially horizontally oriented and positioned between the pair of ramps 42, 44, and at least a portion of the grate may be reticulated with holes to permit aggregate landing on the grate to pass through the grate.

Further included in the base assembly 12 may be a base conveyor 50 mounted on the base frame 14 and which extends along a longitudinal portion of the base frame between the leading 18 and trailing ends of the base frame. The base conveyor 50 may tend to move aggregate falling onto the conveyor toward the trailing end 19 of the frame 14. The base conveyor 50 may have a receiving end 52 and a dispensing end 54, with the receiving end being located toward the leading end 18 and the dispensing end being located toward the trailing end 19 of the base frame. The base conveyor 50 may comprise a base conveyor belt 56 for carrying aggregate away from the unloader structure 40, and at least a portion of the belt 56 may be positioned below the grate 48 such that gravity moves the aggregate through the grate and onto an upper stretch or portion of the belt supporting aggregate being carried by the belt. The base conveyor 50 may have a plurality of support rollers 58 which are mounted on the base frame 14 and extend laterally with respect to the longitudinal axis 16 of the base frame to support the upper stretch of the base conveyor belt.

The aggregate transferring apparatus 10 may further include an aggregate elevating assembly 60 for elevating aggregate received from the base assembly to a relatively higher vertical level or elevation above the ground surface. The aggregate elevating assembly 60 may include a deployable frame 62 which is movably mounted on the base assembly 12. The deployable frame 62 may be mounted on the base frame 14, and may be located toward the trailing end 19. The deployable frame 62 may be elongated with a base end 64 and a free end 66, with the base end being mounted on the base assembly 12. The deployable frame 62 may be movable between a storage position generally corresponding to the transport configuration of the apparatus 10, and a deploy position generally corresponding to the operational configuration of the apparatus. The storage position of the deployable frame 62 may be characterized by the frame 62 being substantially horizontally oriented and generally parallel to the base frame 14 and the ground surface. The deploy position of the deployable frame 14 may be characterized by the frame 14 being oriented substantially vertical, and oriented substantially perpendicular to the base frame 16 and the ground surface. In illustrative embodiments, the deployable frame 62 comprises a truss frame with a space frame about a substantially hollow interior.

The aggregate elevating assembly 60 may also include trailer structure 70 which is configured to provide trailer functionality to the elevating assembly, and by extension the aggregate transferring apparatus 10, when the apparatus 10 is in the transport configuration such that the apparatus 10 may be towed across the ground surface. The trailer structure 70 may be positioned adjacent to, and typically in contact with, the ground surface when the deployable frame is in the storage position (and other elements of the apparatus 10 are in the transport configuration). In greater detail, the trailer structure 70 may include at least one landing leg 72 mounted on the deployable frame 62 to rest upon the ground surface when the deployable frame is in the storage position, and the leg may extend outwardly from the frame 62. Typically, a pair of the landing legs 72, 74 may be utilized with each of the legs having similar orientation with respect to the frame 62. The trailer structure 70 may further include a kingpin 76 mounted on the deployable frame 62 which is able to engage the fifth wheel hitch structure of a vehicle, such as a semi-tractor, for towing the apparatus 10 in the transport configuration. The kingpin 76 may be located toward the free end 66 of the deployable frame 62, and may be directed in the same direction as the landing leg or legs such that the kingpin and the landing legs are directed downwardly toward the ground surface when the apparatus 10 is in the transport configuration. In some embodiments, the free end 66 of the deployable frame 62 may extend beyond the leading end 18 of the base frame 14 when the deployable frame is in the storage position so that the trailer structure is able to move past the base assembly 12 and engage the ground surface.

The aggregate elevating assembly 60 may further include an elevating conveyor 80 for conveying aggregate upwardly from the base assembly 12. The elevating conveyor 80 may extend longitudinally with respect to the deployable frame 62, and may extend from the base end 64 to the free end 66 of the frame 62. The elevating conveyor 60 may be configured to receive aggregate from the base conveyor, and may have an intake 82 and an output 84. The intake 82 may be being located toward the base end 64 of the deployable frame 62 and also may be located adjacent to the dispensing end 54 of the base conveyor 50 to receive aggregate from the conveyor 50. The output 84 may be located toward the free end 66 of the deployable frame, and may be configured to output the conveyed aggregate on the side of the frame 62 that is opposite of the side of the frame 62 at which the intake is located. In some embodiments, the elevating conveyor 80 may comprise a bucket conveyor, and the conveyor 80 may be at least partially within the truss frame of the deployable frame 62. Illustratively, the elevating conveyor 8 may have a length of support o 70 feet or more.

The aggregate transferring apparatus 10 may also include a frame deployment assembly 90 which is configured to move the deployable frame 62 of the elevating assembly 60 with respect to the base frame 14 of the base assembly 12. The frame deployment assembly 90 may be configured to move the deployable frame between the storage and deploy positions for converting the apparatus 10 between the transport and operational configurations. The frame deployment assembly 90 may be mounted on the base frame 14 and the deployable frame 62.

In illustrative embodiments, the frame deployment structure 90 may comprise at least one lift arm structure 92 mounted on the base frame 16 and the deployable frame 62 which may form a linkage between the base frame and the deployable frame. Illustratively, the frame deployment assembly 90 may include a pair of the lift arm structures 92, 94 mounted on the base 14 and deployable 62 frames. In general, the pair of lift arm structures 92, 94 may be laterally spaced with respect to the longitudinal axis 16 of the base frame, and may be located on opposite lateral sides of the deployable frame 62. Each of the lift arm structures 92, 94 may have a first end 96 which is mounted on a base mount point 98 on the base frame 14 which may permit pivotal movement of the first end 96 with respect to the base mount point 98. Further, each of the lift arm structures 92, 94 may have a second end 100 mounted on an upper mount point 102 on the deployable frame 62. The upper mount point 102 may include a cross-member 104 that extends between the pair of lift arm structures 92, 94 and that is mounted on the deployable frame.

In some embodiments, each of the lift arm structures 92, 94 may be articulated between the first 96 and second 100 ends such that the structures 92, 94 articulate as the deployable frame 62 moves between the storage and deploy positions and the apparatus 10 moves between the transport and operational configurations. Each of the lift arm structures 92, 94 may include a first link member 106 and a second link member 108 which are pivotally mounted together. The first link member 106 may have the first end 96 of the respective lift arm structure, and the first link member may be pivotally mounted on the base mount point 98 to pivot with respect to the base frame 14. The first link member 106 may be elongated in shape and have a first intermediate end 110 located on the member 106 opposite of the first end 96 of the lift arm structure. Illustratively, the first link member 106 may be formed by a bar. The second link member 108 may have the second end 100 of the respective lift arm structure, and the second link member may be pivotally mounted on the upper mount point 102 to pivot with respect to the deployable frame 62. The second link member 108 may be elongated in shape and have a second intermediate end 112 located on the member 108 opposite of the second end 100 of the lift arm structure. The second intermediate end 112 of the second link member may be pivotally mounted to the first intermediate end 110 of the first link member. The second link member may form a medial mount point 114. Illustratively, the second link member 108 may comprise a bar and a weldment.

The frame deployment structure 90 may further include lift actuator 116 which acts on at least one of the lift arm structures 92, 94. The lift actuator 116 may be mounted on the base frame 14 and the respective lift arm structure, and may be mounted on the base mount point 98 on the base frame and the medial mount point 114 on the second link member 108 of the respective lift arm structure. The lift actuator 116 may be extendable and retractable in length to move the second link member 108 with respect to the base frame. Illustratively, the lift actuator may comprise a hydraulic actuator, although other types of actuators may also be employed.

Figure 5A:
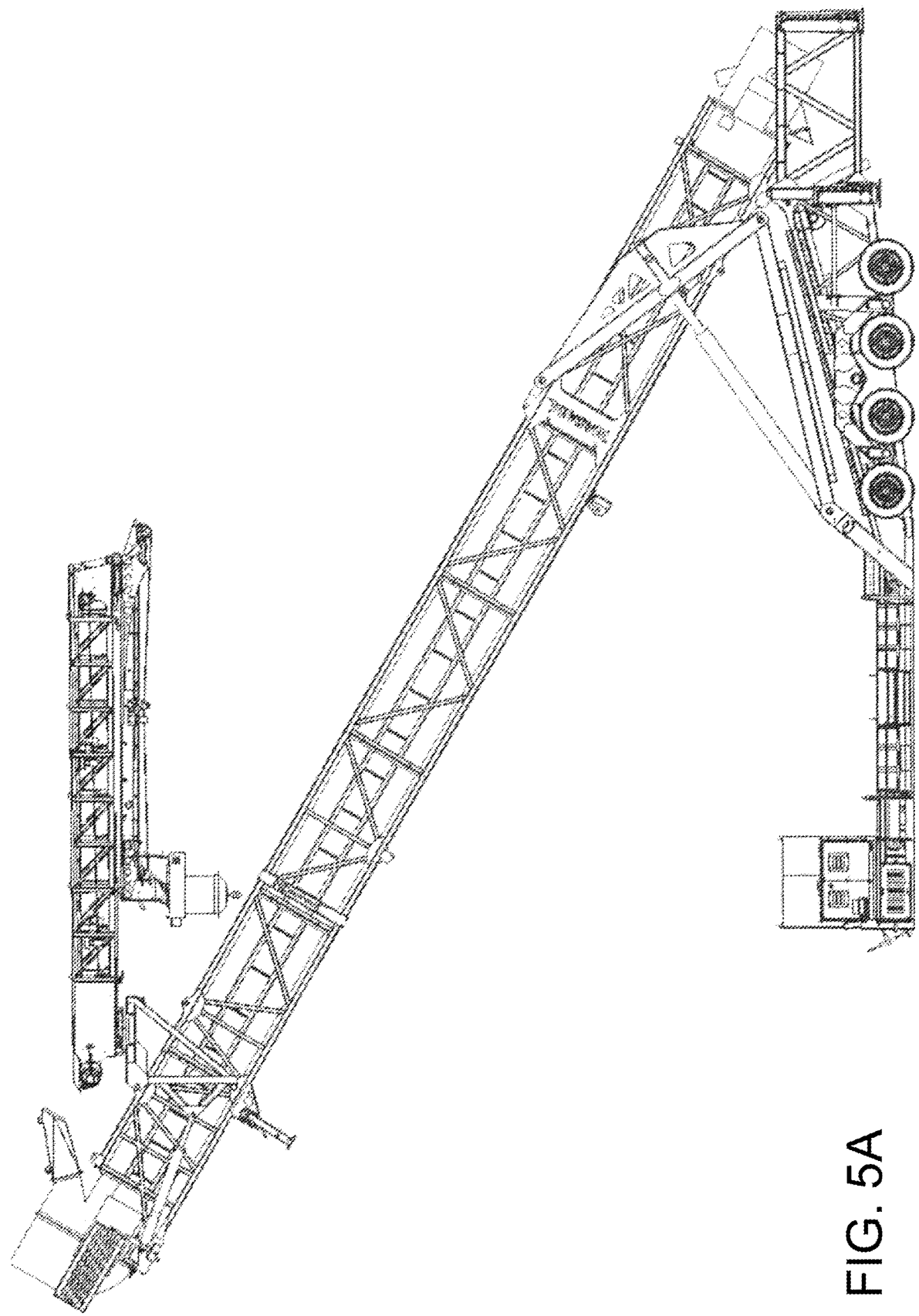
FIG. 5A is a schematic side view of the aggregate transfer apparatus raised out of the transport configuration into a first position, according to an illustrative embodiment.
Figure 5B:
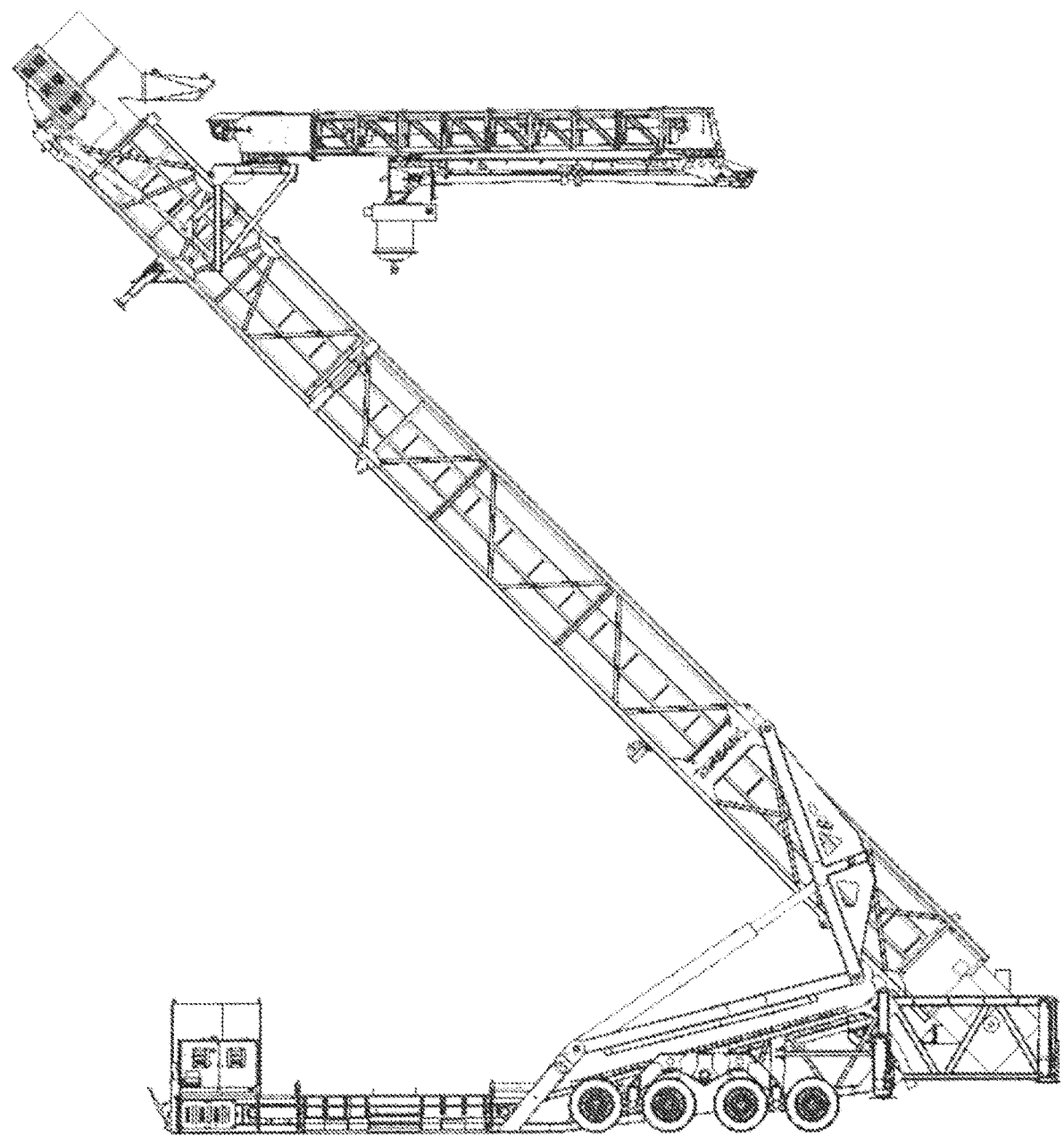
FIG. 5B is a schematic side view of the aggregate transfer apparatus raised out of the transport configuration into a second position, according to an illustrative embodiment.
Figure 5C:
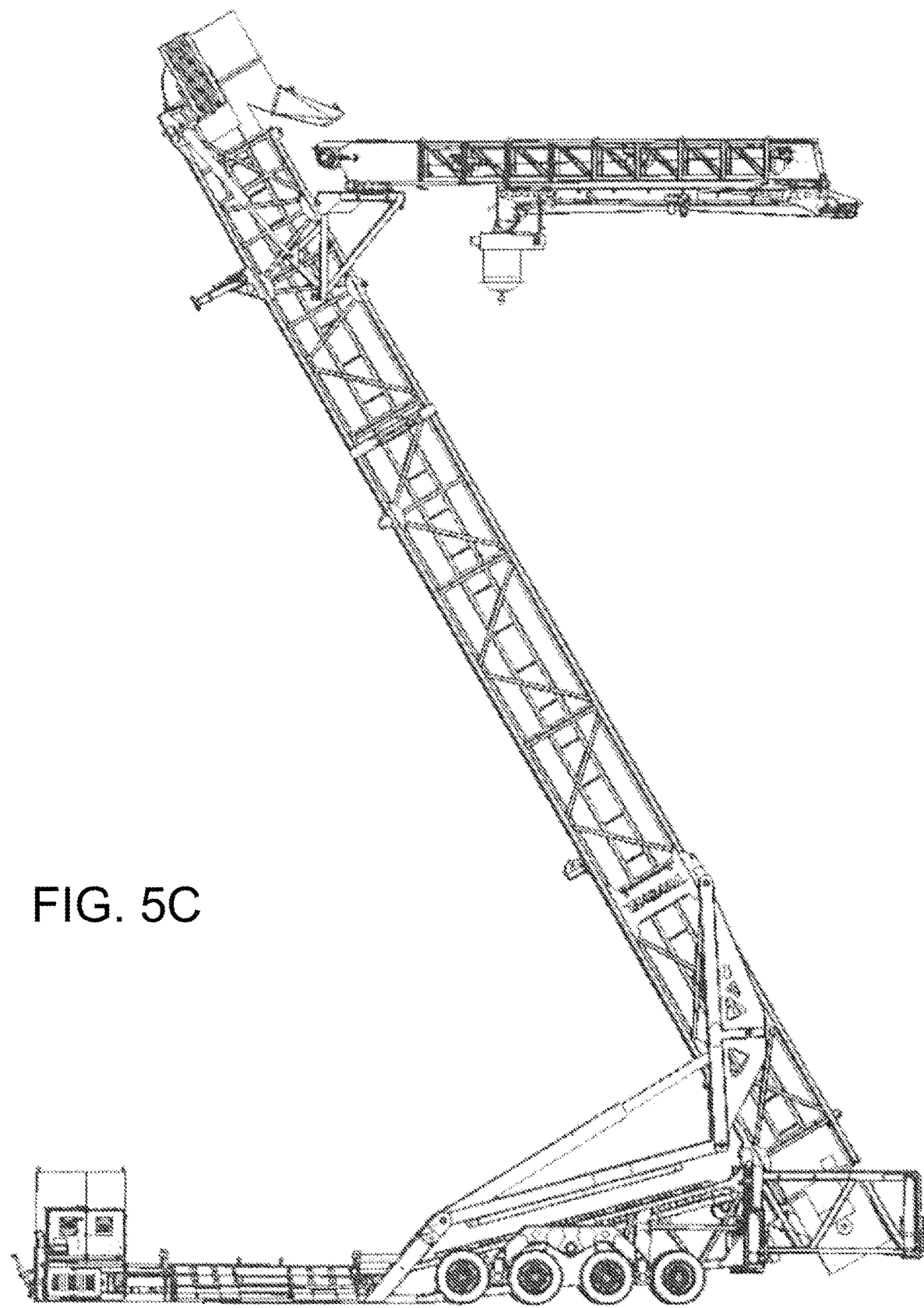
FIG. 5C is a schematic side view of the aggregate transfer apparatus raised out of the transport configuration in a fourth position, according to an illustrative embodiment.
Figure 5D:
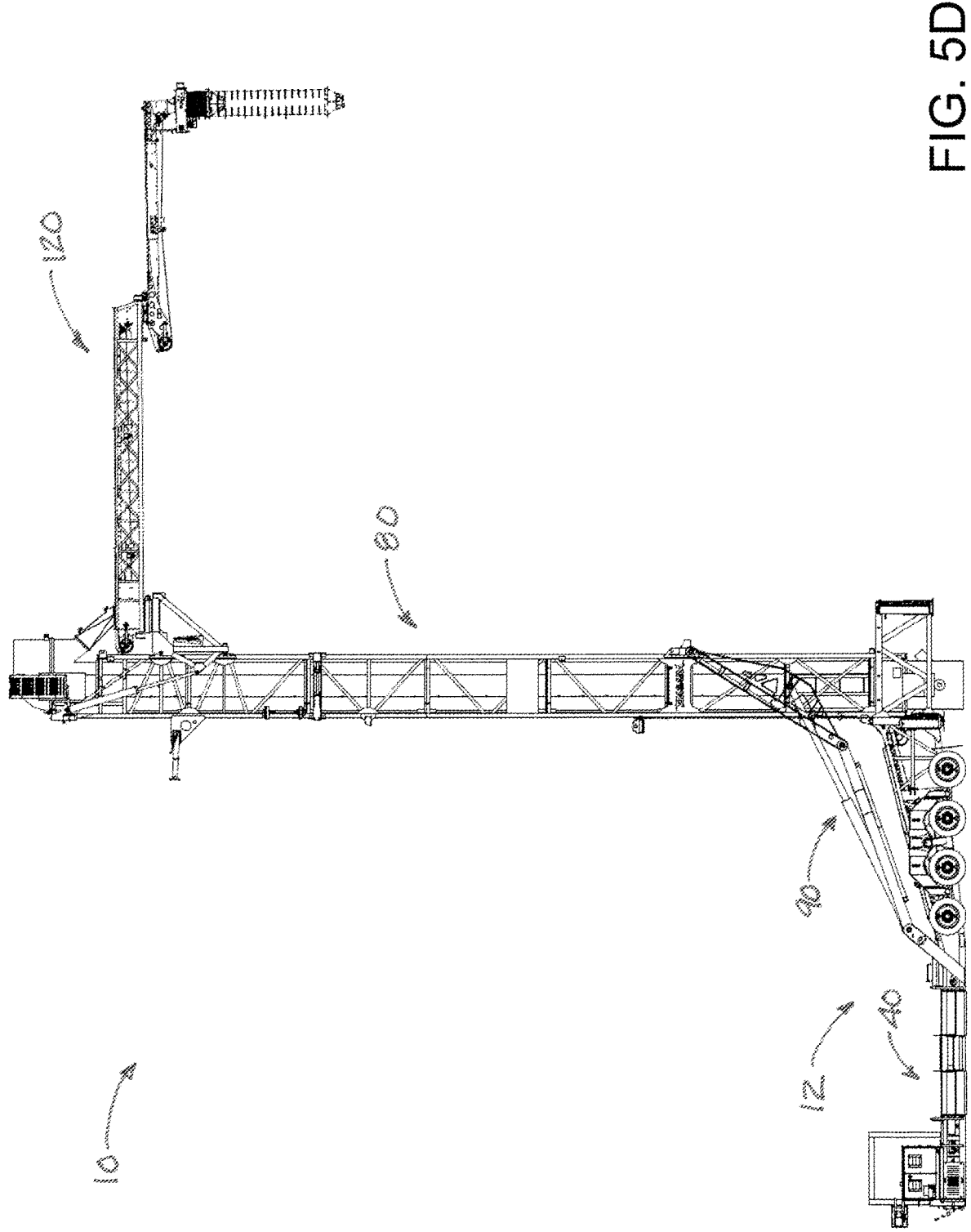
FIG. 5D is a schematic side view of the aggregate transfer apparatus in an operational configuration, according to an illustrative embodiment.
Figure 6:
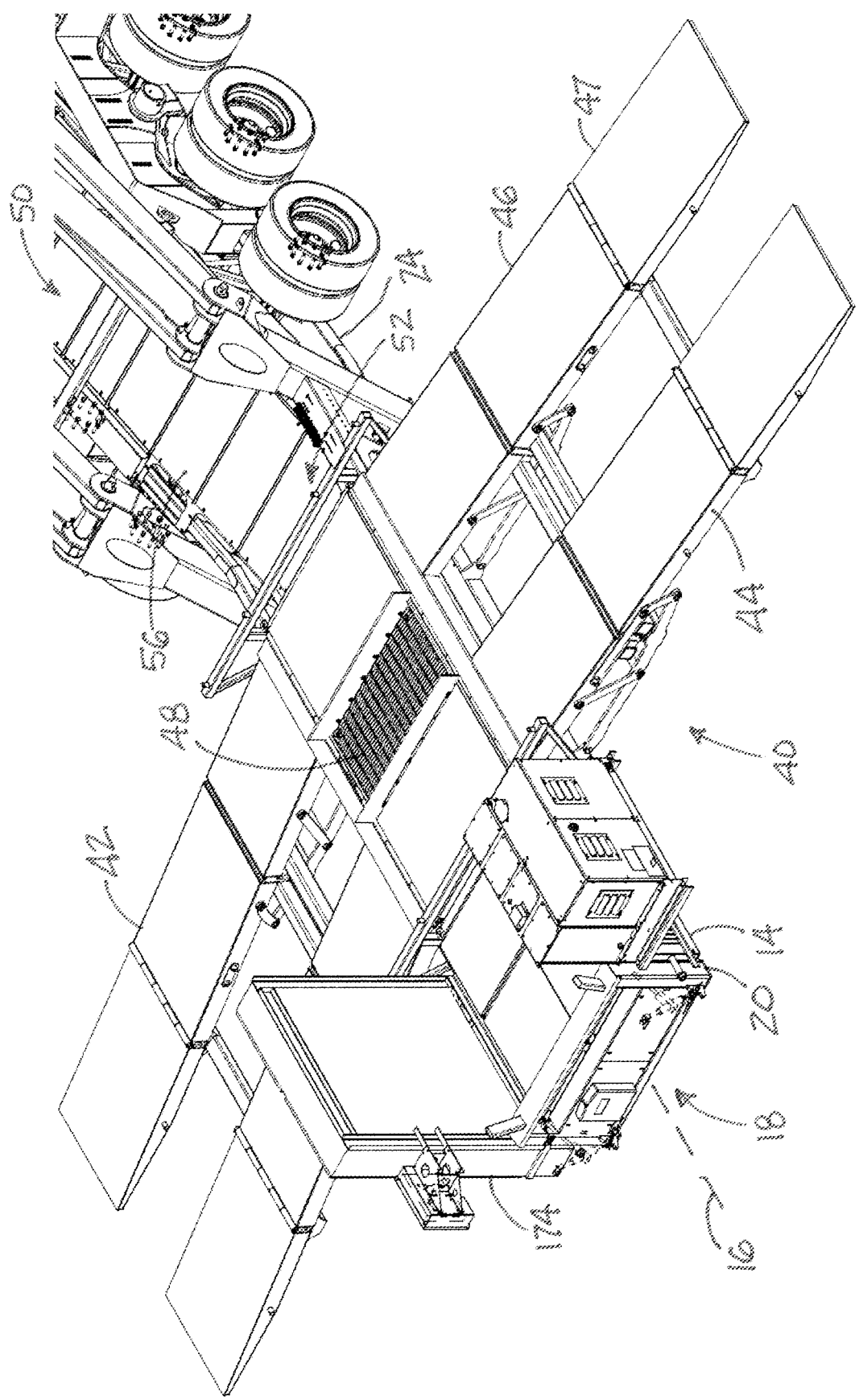
FIG. 6 is a schematic perspective view of a forward portion of the aggregate transfer apparatus in the operational configuration including the unloader structure of the base assembly shown in an operational condition, according to an illustrative embodiment.
Figure 7A:
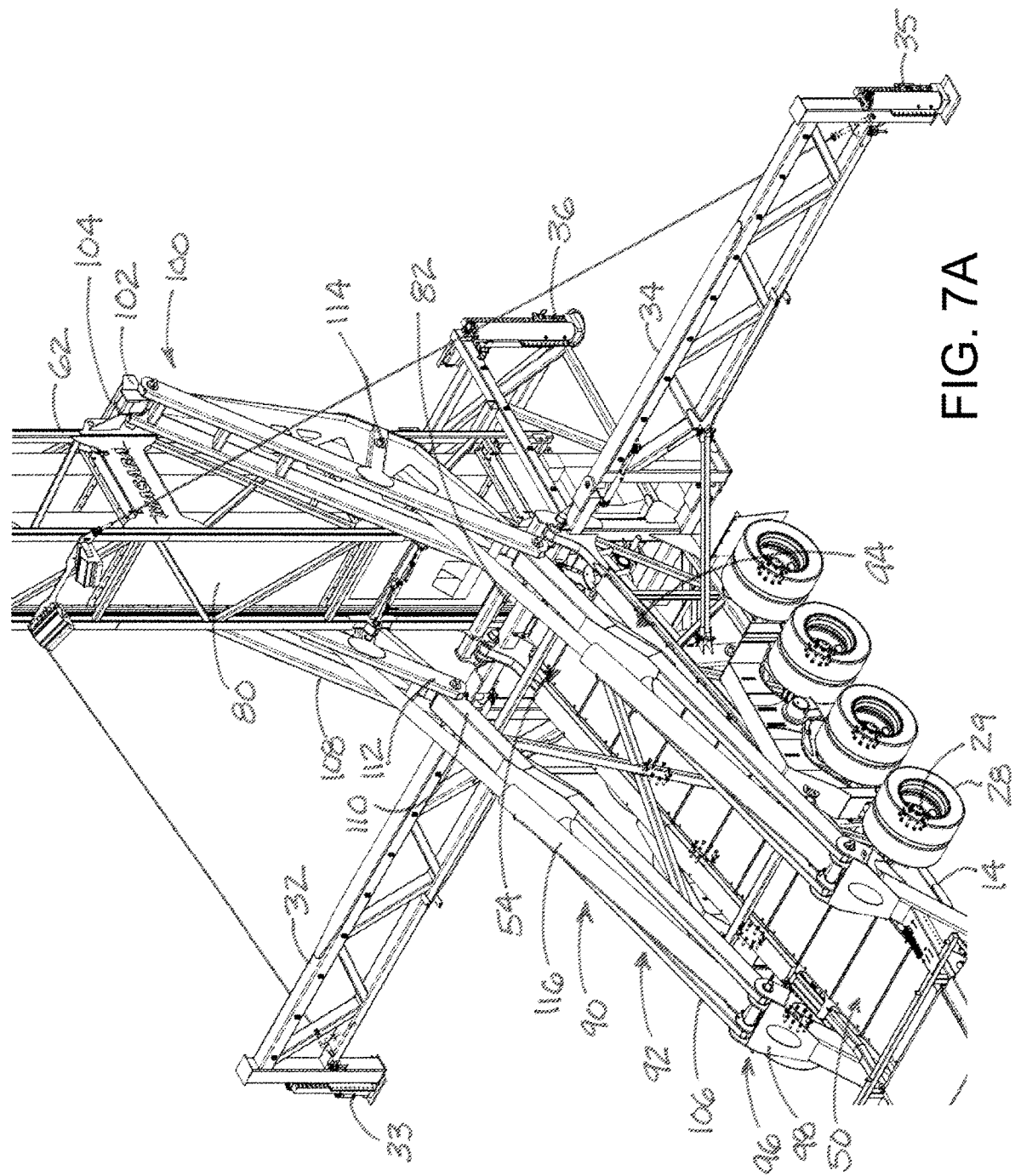
FIG. 7A is a schematic perspective view of a rearward portion of the aggregate transfer apparatus in the operational configuration including the aggregate elevating assembly, according to an illustrative embodiment.
Figure 7B:
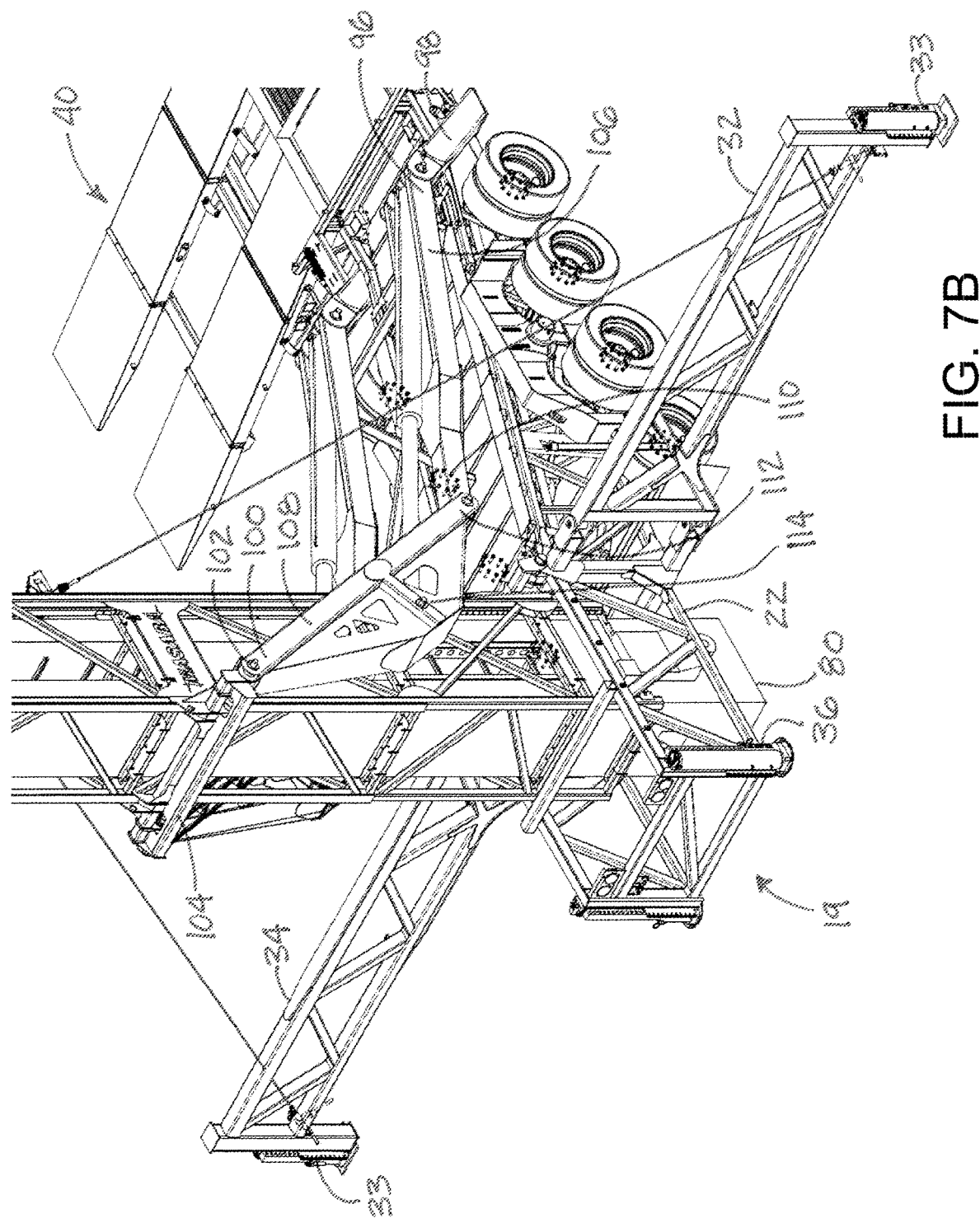
FIG. 7B is a schematic second perspective view of the rearward portion of the aggregate transfer apparatus shown in FIG. 7A, according to an illustrative embodiment.
Figure 8A:
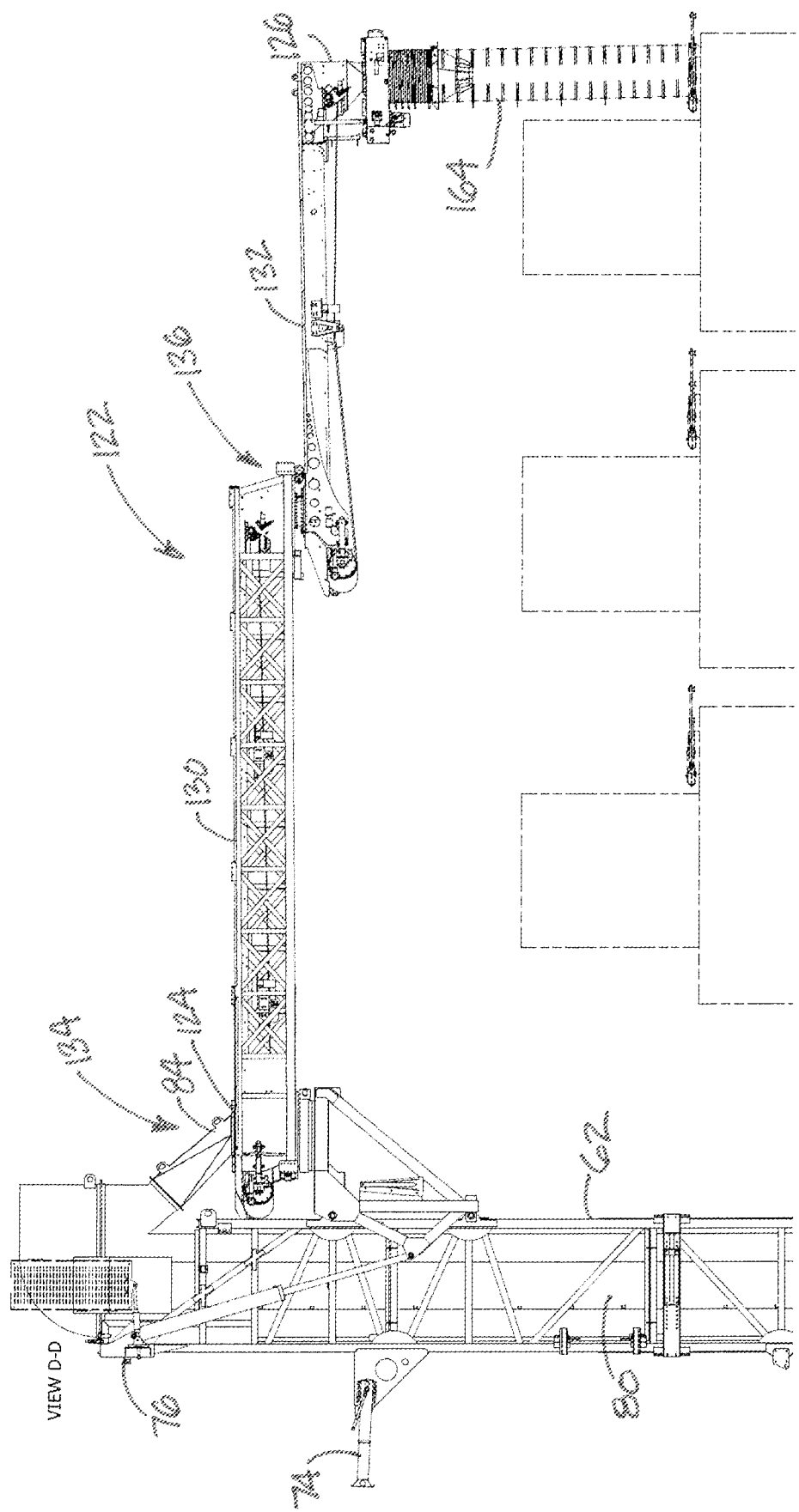
FIG. 8A is a schematic side view of an upper portion of the aggregate transfer apparatus in the operational configuration with the extension conveyor shown in the raised position, according to an illustrative embodiment.
Figure 8B:
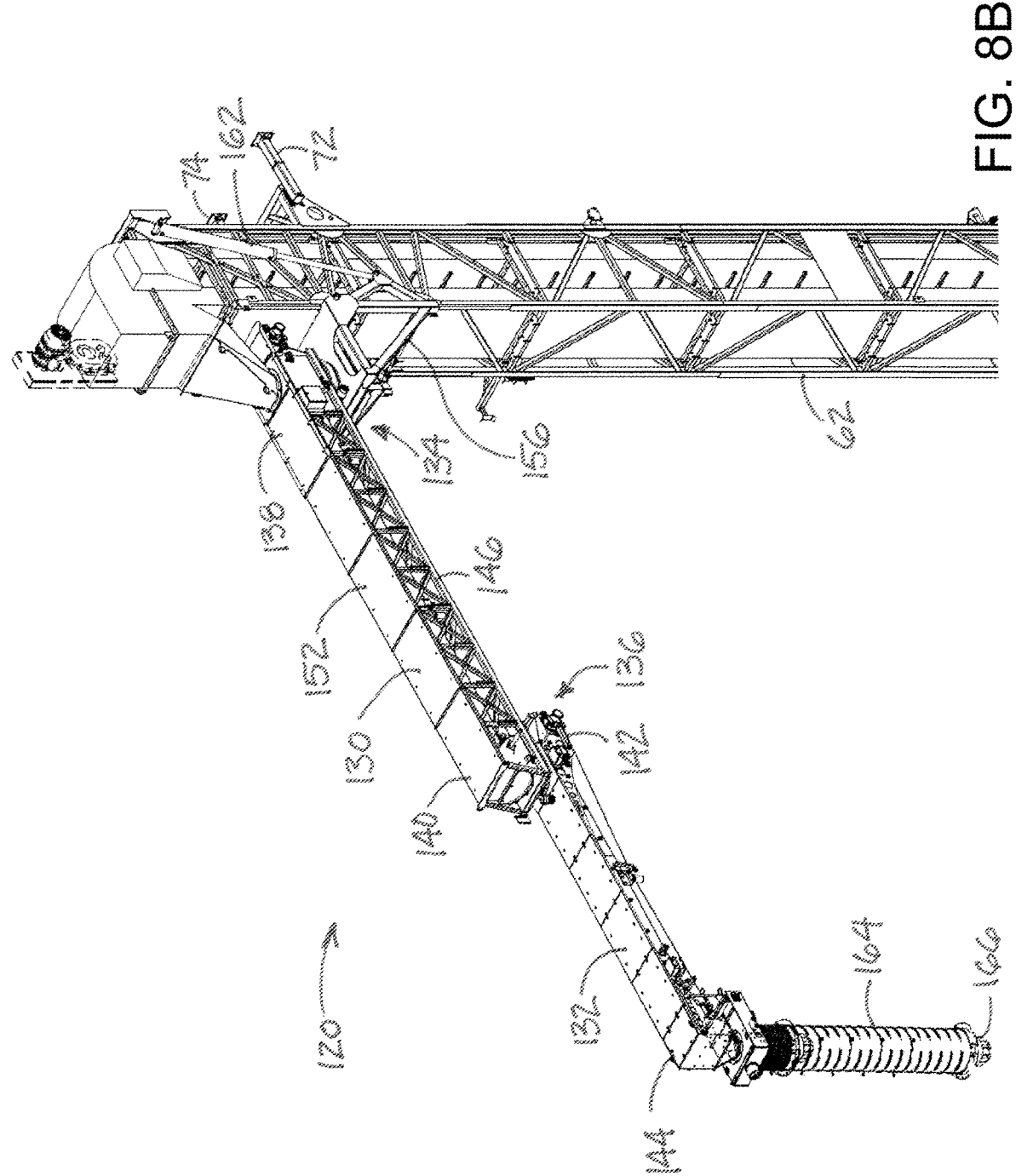
FIG. 8B is a schematic perspective view of the upper portion of the aggregate transfer apparatus in the operational configuration with the extension conveyor shown in the raised position, according to an illustrative embodiment.
Figure 8C:
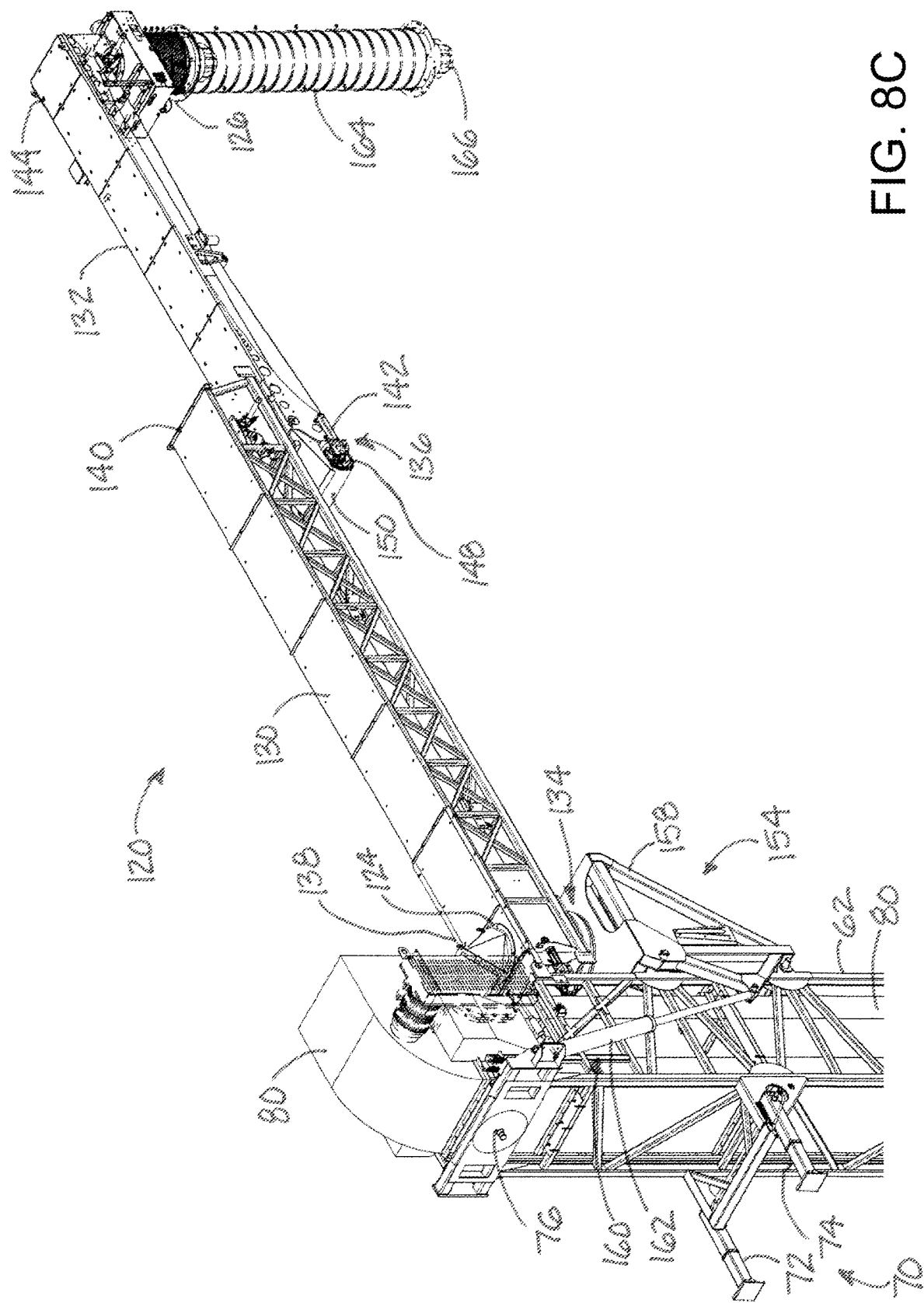
FIG. 8C is a schematic second perspective view of the upper portion of the aggregate transfer apparatus in the operational configuration with the extension conveyor shown in the raised position, according to an illustrative embodiment.
Figure 8D:
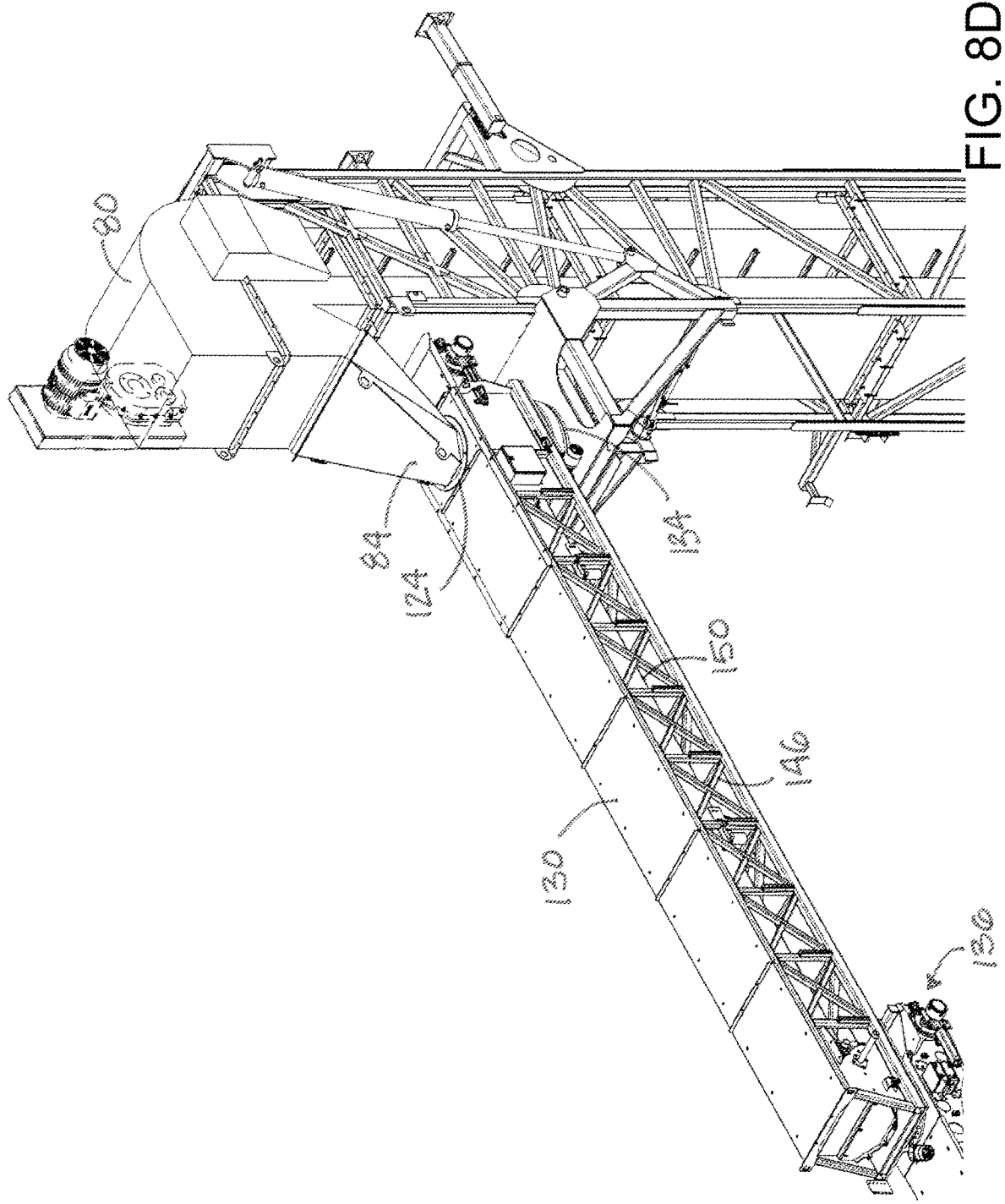
FIG. 8D is a schematic perspective view of the inboard segment of the extension conveyor of the aggregate transfer apparatus, according to an illustrative embodiment.
Figure 8E:
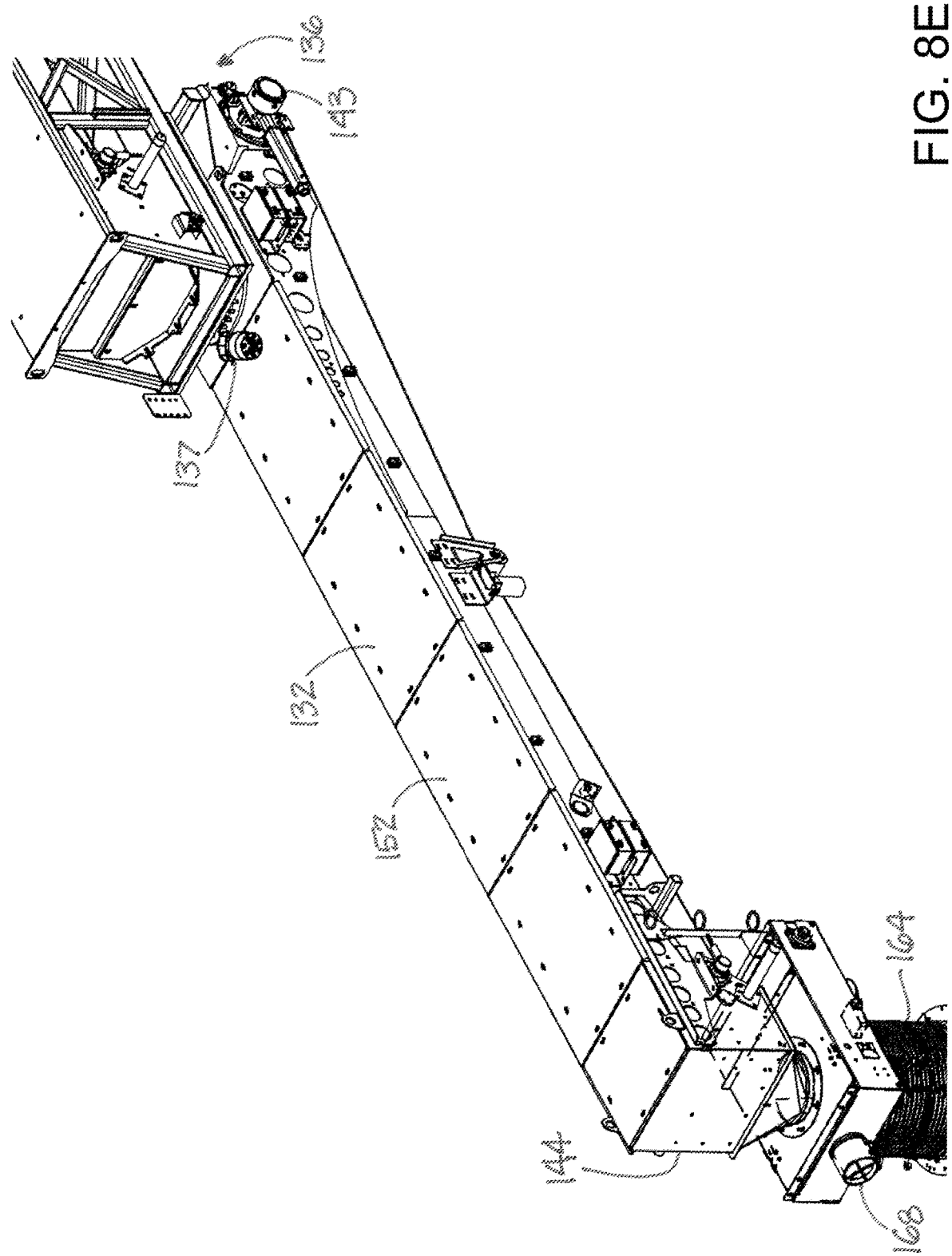
FIG. 8E is a schematic perspective view of the outboard segment of the extension conveyor of the aggregate transfer apparatus, according to an illustrative embodiment.
Figure 8F:
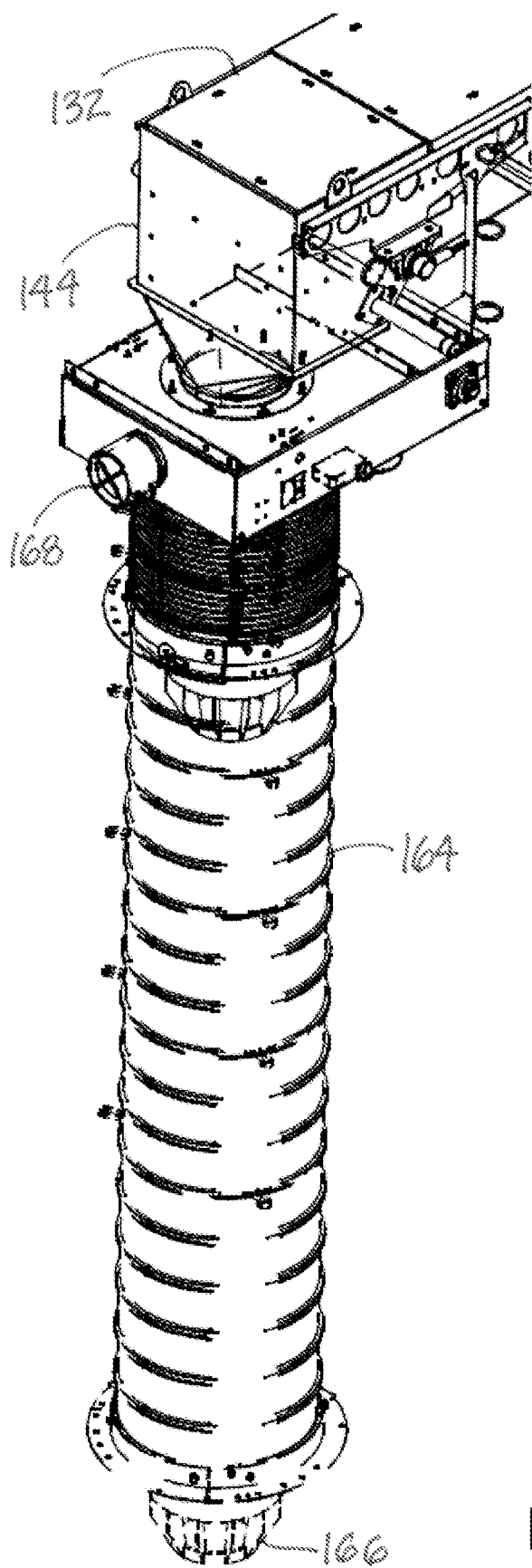
FIG. 8F is a schematic perspective view of the chute of the extension conveyor of the aggregate transfer apparatus, according to an illustrative embodiment.
Figure 9:
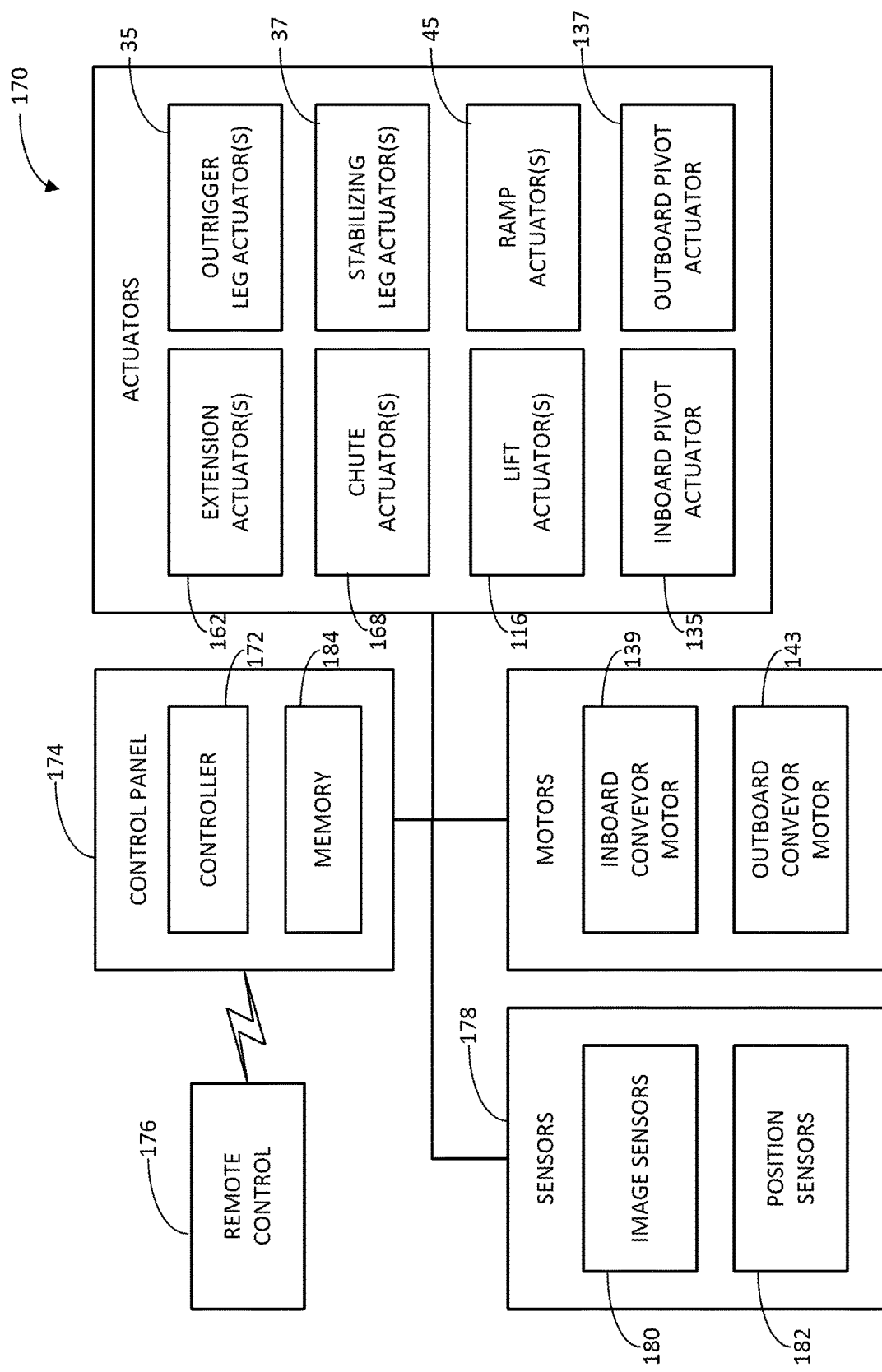
FIG. 9 is a schematic block diagram of elements of control-related elements of the aggregate transfer apparatus, according to an illustrative embodiment.

The aggregate transferring apparatus 10 may further include a conveyor extension assembly 120 for conveying aggregate to locations horizontally outward from the aggregate elevating assembly 60, such as, for example, one or more silos to which the apparatus 10 is positioned adjacent. The conveyor extension assembly 120 may include an extension conveyor 122 for moving aggregate from the aggregate elevating assembly 60 to a location outward from the assembly 60. The extension conveyor 122 may be movable with respect to the elevating assembly 60, and may be extendable outwardly from the assembly 60 in a substantially horizontal orientation. The extension conveyor 122 may be movable between a lowered position (see. e.g., FIG. 2A) and a raised position (see. e.g., FIG. 5D). FIGS. 5A through 5C illustrate three illustrative intermediate positions of the extension conveyor 122 between the lowered position of FIG. 2A and the raised position of FIG. 5D. The lowered position of the extension conveyor 122 may correspond to the transport configuration of the apparatus 10, and the raised position of the conveyor 122 may correspond to an operational configuration of the apparatus. The lowered position may be further characterized by the extension conveyor 122 being positioned adjacent to the deployable frame 62 of the aggregate elevating assembly 60, and the extension conveyor may be oriented substantially parallel to the deployable frame 62 in the lowered position. The raised position of the conveyor 122 may also be characterized by the extension conveyor being positioned generally away from the deployable frame 62, and the extension conveyor may be cantilevered outwardly from the deployable frame in the raised position. The raised position of the extension conveyor 122 may further be characterized by the conveyor 122 being oriented substantially perpendicular to the deployable frame 62 of the aggregate elevating assembly. As illustrated in FIGS. 5A through 5D, the extension conveyor 122 may be maintained in a substantially horizontal orientation (e.g., substantially parallel to the base frame 14) as the deployable frame 62 of the elevating assembly 60 is raised from the storage position to the deploy position, and similarly the conveyor 122 may be maintained and the substantially horizontal orientation as the frame 62 is lowered from the deploy position to the storage position.

The extension conveyor 122 may have an inlet 124 for receiving aggregate from the aggregate elevating assembly 60 and an outlet 126 for dispensing aggregate from the extension conveyor to a desired location, such as into the port 2 at the top of a silo.

The conveyor extension assembly 120 may comprise an inboard segment 130 and an outboard segment 132, with the inboard and outboard segments being articulated with respect to each other to permit adjustment of the position of the outlet 126 with respect to the inlet 124 including the effective distance between the outlet 126 and the inlet 124. The inboard segment 130 may be pivotally connected to the deployable frame 62 of the aggregate elevating assembly by an inboard pivot 134, which may permit pivoting of the inboard segment 130 with respect to the deployable frame about a substantially vertical axis. The outboard segment 132 may be pivotally connected to the inboard segment 130 by an outboard pivot 136, which may permit pivoting of the outboard segment 132 with respect to the inboard segment 130 about a substantially vertical axis. The inboard segment 130 has a first inboard segment end 138 mounted on the deployable frame 62, and may be configured to receive aggregate from the output 84 of the elevating conveyor 80. The inboard segment 130 may also have a second inboard segment end 140 which is located opposite of the first inboard segment end 138 on the segment 130, and may also be located at the outboard pivot 136. The outboard segment 132 has a first outboard segment end 142 which is located at the outboard pivot 136 and which may be pivotally mounted on the second inboard segment end 140 of the inboard segment 130. The outboard segment 132 has a second outboard segment end 144 which is located opposite of the first outboard segment end 142, and the outlet 126 of the extension conveyor may be located at the second outboard segment end. Movement of the inboard segment with respect to the deployable frame at the inboard pivot, and the outboard segment with respect to the inboard segment at the outboard pivot, may be accomplished using any suitable mechanism. In some embodiments, an inboard pivot actuator 135 may be configured to pivot the inboard segment 130 with respect to the deployable frame 62, and the inboard pivot actuator may act between the deployable frame and the truss frame of the inboard segment. Additionally, an outboard pivot actuator 137 may be configured to pivot the outboard segment 132 with respect to the inboard segment 130, and the outboard pivot actuator may act between the inboard and outboard segments. Illustratively, the inboard pivot actuator 135 and the outboard pivot actuator 137 may comprise, such as, for example, a slew drive mechanism which may be highly suitable for permitting transfer of aggregate from the elevating conveyor 80 to inboard segment 130 of the extension conveyor 122, and from the inboard segment to the outboard segment 132 of the extension conveyor.

Each of the inboard 130 and outboard 132 segments may have substantially similar constructions. Illustratively, each segment may include a truss frame 146 and a plurality of support rollers 148 rotatably mounted on the truss frame 146. Each segment may further include a conveyor belt 150 which may be an endless belt supported on the support rollers 148, and an upper wall 152 may be mounted on the truss frame in a position above the conveyor belt to at least partially cover an upper stretch of the conveyor belt as well is aggregate carried by the upper stretch.

In some embodiments, when in the transport configuration of the apparatus 10, the inboard segment 130 of the extension conveyor 122 may be positioned over a portion of the deployable frame 62 of the aggregate elevating assembly, and the outboard segment 132 of the extension conveyor may be positioned laterally alongside a portion of the deployable frame 62.

The conveyor extension assembly 120 may also comprise a conveyor support frame 154 for supporting the segments 130, 132 of the extension conveyor on the aggregate elevating assembly 60. The conveyor support frame 154 may be movable with respect to the deployable frame 62 of the elevating assembly when the extension conveyor 122 moves between the lowered and raised positions, and the conveyor support frame may be pivotally mounted on the deployable frame to permit pivoting of the support frame 154 with respect to the deployable frame about a substantially horizontal axis. The inboard segment 130 may be pivotally mounted on the support frame by the inboard pivot 134. Illustratively, the conveyor support frame 154 may include a pair of lateral sections 156, 158 which are positionable on the lateral sides of the deployable frame 62, particularly when the extension conveyor 122 is in the lowered position.

A conveyor extension assembly 120 may further comprise an extension conveyor lift structure 160 for moving the extension conveyor 122 between the lowered position and the raised position. The extension conveyor lift structure 160 may act on the conveyor support frame 154 and may be mounted on the conveyor support frame and the deployable frame 66. The extension conveyor lift structure 160 may comprise at least one extension actuator 162 which may be extendable to pivot the conveyor support frame 154 away from the deployable frame 62 and move the extension conveyor 122 to the raised position. The extension actuator 162 may be retractable to pivot the conveyor support frame 154 toward the deployable frame and move the extension conveyor 122 to the lowered position. In some highly preferred embodiments, a pair of the extension actuators 162 may be provided and may be positioned along the lateral side of the deployable frame.

The conveyor extension assembly 120 may further include an inboard conveyor motor 139 which is configured to move the conveyor belt of the inboard conveyor segment 130, and may be mounted on the truss frame of the inboard conveyor segment. Additionally, the conveyor extension assembly 120 may include an outboard conveyor motor 143 which is configured to move the conveyor belt of the outboard conveyor segment 132, and may be mounted on the truss frame of the outboard conveyor segment.

The conveyor extension assembly 120 may further include a chute 164 for receiving aggregate from the extension conveyor 122. The chute 164 may be mounted on the outboard segment 136 of the extension conveyor, and may be in communication with the outlet 126 of the conveyor 122 to receive aggregate from the conveyor. The chute 164 may be located at the second outboard segment end 144, and may extend downwardly from the outlet. The chute 164 may terminate in a spout 166 where the conveyed aggregate exits the chute. In some embodiments, the chute 164 may be extendable to selectively increase the length of the chute to permit the spout 166 at the end of the chute to be moved closer to (and optionally into) the port 2 at the top of the silo to reduce the potential generation of dust in the air, and then raise the spout 166 to permit the end to avoid contact with elements such as the perimeter wall of the silo while repositioning the chute to another silo or removing the chute from proximity to the silo grouping. The chute 164 may be movable between an extended condition (see, e.g., FIG. 8F) and a retracted condition (see, e.g., FIG. 3), and the spout 166 may have an extended position corresponding to the extended condition of the chute and a retracted position corresponding to the retracted condition of the chute. The retracted position of the spout 166 may be relatively closer to the outboard segment 132 of the extension conveyor 122 than the extended position of the spout. In embodiments, the chute 164 may be moved between the extended and retracted conditions by a chute actuator 168. Illustratively, the chute may be formed of a flexible material to permit portions of the chute to more readily pass over structures such as the tops of silos.

The apparatus 10 may further include a control assembly 170 for providing control and monitoring of various elements of the apparatus 10. The control assembly 170 may include a controller 172 which may automatically, or at the input of the operator, control elements of the apparatus. The control assembly 170 may also include manually-operated controls. Elements of the control assembly 170, such as the controller 172, may be located on a control panel 174 which may be positioned on the base frame 14 of the base assembly or any other suitable position which is accessible by an operator (such as an operator standing on the ground surface adjacent to the apparatus). Various operator controls may be provided on the control panel 174 which directly or indirectly control the operation of elements of the apparatus 10. In addition to the control panel 174, a remote control device 176 may be provided to control some or all of the functions of the apparatus 10 at a location away from the control panel 174, and the remote control device may communicate with the control panel through a wired or wireless communication connection. Advantageously, the remote control device 176 may be configured to control elements or functions for which it is desirable that the operator and other personnel are located away from the control panel 174 for purposes of safety or observation.

The controller 172 may receive and process information from a plurality of sensors 178 of the apparatus 10, through one or more suitable interfaces. The plurality of sensors 184 may sense various conditions or positions of elements of the apparatus or the environment about the apparatus. The plurality of sensors may include sensors for sensing conditions of various elements, such as a plurality of image sensors 180 positioned on the apparatus for capturing video or still images from perspectives on the apparatus. Illustratively, image sensors 176 may be positioned adjacent to the chute 164, and may be directed downwardly from the second outboard segment end 140 for capturing images of the position of the spout 166 below with relation to, for example, the port 2 of a silo 1. Additionally, image sensors 176 may be positioned at other locations on the apparatus 10 where visual information would be helpful, such as, for example, the upper free end 66 of the deployable frame 62 looking downwardly on the apparatus 10 using one or more of the image sensors. Images produced by the image sensors may be displayed on a display screen or monitor. The control assembly 170 may further include sensors for sensing positions of various elements, such as a plurality of segment position sensors 182 for sensing positions of the inboard 130 and outboard 132 segments of the extension conveyor. Illustratively, each of the segment position sensors 178 may be located at one or all of the inboard 134 and outboard 136 pivots, and each position sensor may be associated with one of the pivot actuators 135, 137 to sense and communicate the relative positions of the elements connected at the respective pivot. For example, an encoder device may be associated with each slew drive mechanism of the pivot actuators.

Broadly, the control assembly 170 may also include elements of the apparatus 10 which receive commands or signals from the controller 172 (or operator-manipulated manual controls) in order to operate elements of the apparatus 10, such as the power control circuitry which provides electrical power to elements of the apparatus such as the motors and valves which control the supply of hydraulic fluid to elements of the apparatus such as hydraulic actuators.

The control assembly 170 may implement automatic or semi-automatic functionality in the operation of the various powered elements of the apparatus 10 to provide safety and convenience in the operation of the apparatus. As an example, for elements for which the initiation or termination of operation of the elements in a sequential manner is desirable or necessary, the controller 172 may be programmed to initiate or terminate the operation in the sequence in response to a single input or command from the operator. Further, memory 184 associated with the controller 172 may retain information for enabling repeated movements by or positioning of elements of the apparatus. For example, the relative positions of the inboard 134 and outboard 136 segments of the extension conveyor 122 corresponding to the loading of specific silos in the silo array may be stored in memory 184 such that the controller 172 is able to recall the position and orientation information of the elements from the memory when invoked or requested by the operator in order for the controller to operate elements of the apparatus 10 to cause the chute 164 to be moved to a location suitable to dispense aggregate to the identified silo of the array from the spout 166.

Another aspect of the disclosure is a method of setting up an apparatus, such as an apparatus of the type of the aggregate transferring apparatus 10 of the disclosure, may include providing an apparatus which may have a base assembly including a base frame and an outrigger structure and an unloader structure, an aggregate elevating assembly including a deployable frame, a frame deployment assembly including at least one lift arm structure, a conveyor extension assembly including an extension conveyor with an inboard segment, an outboard segment, and a chute, and a control assembly. The method may include identifying an area of ground surface for deployment of the apparatus, and that may include determining that the area of ground surface is substantially level and is suitably compacted for bearing the weight of the apparatus. The identification of the area of ground surface may also include determining that a space about the area of ground surface is clear of obstructions for deploying elements of the apparatus such as, for example, the outrigger structure of the base assembly and the deployable frame of the aggregate elevating assembly.

The method may also include positioning the apparatus 10 on the area of ground surface, which may involve towing the apparatus to the area of ground surface by a towing vehicle, such as a semi-tractor. The method may further include connecting a power source to the apparatus 10 to provide power to the control assembly 170 and the various elements of the control assembly. Such power source may be an electrical power source, and may involve the connection of an electrical power cord between the controller assembly 170 and an electrical power source.

Another aspect of the method may include removing the apparatus 10 from a travel configuration, or a configuration of the apparatus suitable for transporting the apparatus on roads and highways. This aspect of the method may include retracting a lift actuator 116 acting on at least one lift arm structure 92 of the flame deployment assembly 90 to move at least a portion of the base assembly 12 upwardly in a supportive manner to at least partially remove the weight of the base assembly 12 from travel binders 3 (see, e.g., FIG. 3) utilized to secure the base assembly and aggregate elevating assembly 60 together during transport in the travel configuration. This aspect of the method may also include removing the travel binders from the base assembly 12 and elevating assembly 60 after the retraction of the lift actuator 116. Removing the apparatus from the travel configuration may further include extending at least one landing leg 72 of the trailer structure 70 of the deployable frame 62 to contact the ground surface, and may involve engaging a brake on the wheels of the towing vehicle prior to extending the landing gear and disconnecting the apparatus from the power source after extending the landing gear. Removing the apparatus from the travel configuration may also include extending the lift actuator 116 acting on the lift arm structure to permit the base assembly to contact the area of ground surface.

Another aspect of the method may include deploying the outrigger structure 30 of the base assembly to contact the area of ground surface, and may involve swinging at least one outrigger arm 32 of the outrigger structure 30 outwardly from the non-stabilizing condition to the stabilizing condition, and may further involve extending one or more outrigger legs 33 associated with the outrigger arm or arms 32 to contact the ground surface. Additionally, extending a stabilizer leg 36 to contact the ground surface may also be initiated. Extending of the outrigger leg 33 and the stabilizer leg 36 may be performed by operating the outrigger leg actuator 35 and the stabilizing leg actuator 37 (respectively).

In still another aspect of the method, the unloader structure 40 may be moved from the transport condition to the operational condition, which may involve deploying ramps of the unloader structure. In greater detail, some implementations of this aspect may include removing travel restraint links from the ramps 42, 44 of the unloader structure, and pivoting the ramps from a position corresponding to the transport condition to a position corresponding to the operational condition. In embodiments in which the ramps include multiple portions, the pivoting of the ramps may include pivoting the ramp portions of each ramp to the position corresponding to the operational condition.

A further aspect of the method may include deploying the aggregate elevating assembly 60, which may involve rotating the deployable frame 62 upwardly into the deploy position of the frame 62, which may be performed while maintaining the inboard 130 and outboard 132 segments of the extension conveyor 122 in a substantially horizontal orientation as the deployable frame rotates into the deploy position. The deployment of the elevating assembly 60 may further include engaging lock pins to secure the deployable frame 62 in the deploy position, and attaching guy wires or cables to the frame 62 and the outrigger structure 30 such that the wires extend from the outrigger arms 32, 34 to on the frame 62 at locations spaced upwardly from the base end 64 of the frame 62. In some implementations, the travel binders may be utilized to tension the guy wires.

Yet another aspect of the disclosure is a method of operating an apparatus, such as an apparatus of the type of the aggregate transferring apparatus 10 of the disclosure. The method may include positioning the chute 164 over the port 2 of a silo to which the aggregate is to be transferred, and extending the chute so that the spout 166 of the chute moves into proximity of the port 2 of the silo, such as positioning the spout of the chute in the port. The method may further include positioning an aggregate transporting vehicle on the unloader structure 40, which may involve moving a gate of the aggregate transporting vehicle into a position above the grate 48 of the unloader structure. The method may also include initiating operation of the extension conveyor 122, the elevating conveyor 80, and the base conveyor 50, and may involve first initiating operation of the extension conveyor, then second initiating operation of the elevating conveyor, and then third initiating operation of the base conveyor.

Another aspect of the method of operating the apparatus may include unloading aggregate from the aggregate transporting vehicle into the unloader structure 40, and moving the unloaded aggregate along the base conveyor 50 to the elevating conveyor 80, and along the elevating conveyor 80 to the extension conveyor 122, and along the extension conveyor 122 to the chute 164 of the extension conveyor. The method of operating the apparatus may also include periodically or occasionally relocating the chute 164 to the port 2 of another silo, and may involve emptying aggregate from the apparatus prior to the relocating movement, including emptying aggregate from the base conveyor, emptying aggregate from the elevating conveyor, and emptying aggregate from the extension conveyor. The relocation of the chute may also include retracting the chute to elevate the spout toward the retracted position, positioning the spout of the chute over a port 2 of another silo, and extending the chute to lower the spout toward the extended position adjacent to the second silo port. Further, the method may implement initiating operation of the conveyors of the apparatus, and may involve first initiating operation of the extension conveyor, then second initiating operation of the elevating conveyor, and then third initiating operation of the base conveyor, and unloading aggregate from the aggregate transporting vehicle into the unloader structure to move the aggregate from unloader structure of the base assembly to the spout of the conveyor extension assembly.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An aggregate transferring apparatus for elevating and transferring aggregate, the apparatus comprising:
   a base assembly for receiving aggregate to be conveyed by the transferring apparatus, the base assembly comprising:
      a base frame being elongated along a longitudinal axis and having a leading end and a trailing end;
      an unloader structure mounted on the base frame to receive aggregate from a vehicle at least partially positioned over the base frame; and
      a base conveyor mounted on the base frame and extending along a longitudinal portion of the base frame between the leading and trailing ends of the base frame, a portion of the base conveyor being positioned adjacent to the unloader structure to receive aggregate from the vehicle positioned over the base frame;
   an aggregate elevating assembly for elevating aggregate from the base assembly, the aggregate elevating assembly comprising:
      a deployable frame mounted on the base frame and being movable between a storage position and a deploy position, the storage position corresponding to a transport configuration of the apparatus and the deploy position corresponding to an operational configuration of the apparatus, the deployable frame being elongated with a base end and a free end; and
      an elevating conveyor configured to receive aggregate from the base conveyor and convey the aggregate upwardly from the base assembly toward the free end of the deployable frame; and
   a conveyor extension assembly for conveying aggregate to locations horizontally outward from the aggregate elevating assembly, the conveyor extension assembly comprising:
      an extension conveyor for moving aggregate from an inlet of the extension conveyor to an outlet of the extension conveyor at a location outward from the aggregate elevating assembly, the extension conveyor being movable with respect to the aggregate elevating assembly between a lowered position corresponding to the transport configuration of the apparatus and a raised position corresponding to the operational configuration of the apparatus, the lowered position being characterized by the extension conveyor being positioned adjacent to the deployable frame of the aggregate elevating assembly, the raised position being characterized by the extension conveyor being positioned generally away from the deployable frame of the aggregate elevating assembly, and
      wherein the extension conveyor is articulated between the inlet and outlet with an inboard segment and an outboard segment, the inboard segment being pivotally connected to the deployable frame of the aggregate elevating assembly by an inboard pivot, the outboard segment being pivotally connected to the inboard segment by an outboard pivot.

2. The apparatus of claim 1 wherein the base assembly has at least one axle and a pair of wheels mounted on the at least one axle such that the base assembly is transportable across the ground surface.

3. The apparatus of claim 2 wherein the aggregate elevating assembly includes trailer structure configured to permit the apparatus to be towed across a ground surface, the trailer structure being positioned adjacent to the ground surface when the deployable frame is in the storage position.

4. The apparatus of claim 3 wherein the trailer structure comprises:
at least one landing leg mounted on the deployable frame to rest upon the ground surface when the deployable frame is in the storage position; and
a kingpin mounted on the deployable frame toward the free end of the deployable frame, the kingpin being directed in a same direction as the at least one landing leg to engage a hitch of a towing vehicle when the deployable frame is in the storage position.

5. The apparatus of claim 1 wherein the aggregate elevating assembly includes a frame deployment assembly configured to move the deployable frame with respect to the base frame between the storage and deploy positions, the frame deployment structure comprising:
at least one lift arm structure mounted on the base frame and the deployable frame and forming a linkage between the base frame and the deployable frame, the at least one lift arm structure being articulated between opposite first and second ends of the arm structure; and
an actuator mounted on the base frame and the at least one lift arm structure to move the at least one lift arm structure with respect to the base frame.

6. The apparatus of claim 5 wherein the at least one lift arm structure comprising a pair of the lift arm structures mounted on the base frame and the deployable frame, the pair of lift arm structures being located on opposite lateral sides of the deployable frame.

7. The apparatus of claim 5 wherein the at least one lift arm structure comprises a first link member and a second link member pivotally mounted together; and
wherein the actuator of the frame deployment assembly is mounted on a base mount point on the base frame and a medial mount point on the second link member.

8. The apparatus of claim 1 wherein the lowered position of the extension conveyor of the conveyor extension assembly is characterized by the extension conveyor being oriented substantially parallel to the deployable frame of the aggregate elevating assembly, the raised position of the extension conveyor being characterized by the extension conveyor being oriented substantially perpendicular to the deployable frame of the aggregate elevating assembly.

9. The apparatus of claim 1 wherein the raised position of the extension conveyor of the conveyor extension assembly is characterized by the extension conveyor being cantilevered outwardly from the deployable frame of the aggregate elevating assembly.

10. The apparatus of claim 1 wherein the inboard segment of the extension conveyor of the conveyor extension assembly is pivotable at the inboard pivot about a substantially vertical axis with respect to the deployable frame at the inboard pivot when the extension conveyor is in the raised position, the outboard segment of the extension conveyor being pivotable at the outboard pivot about a substantially vertical axis with respect to the inboard segment when the extension conveyor is in the raised position.

11. The apparatus of claim 1 wherein the outboard pivot of the extension conveyor of the conveyor extension assembly is configured to permit transfer of aggregate from the inboard segment to the outboard segment.

12. The apparatus of claim 1 wherein the conveyor extension assembly additionally comprises:
a conveyor support frame supporting the segments of the extension conveyor on the aggregate elevating assembly, the conveyor support frame being movable with respect to the deployable frame of the aggregate elevating assembly when the extension conveyor moves between the lowered position and the raised position; and
an extension conveyor lift structure acting on the conveyor support frame for moving the extension conveyor between the lowered position and the raised position.

13. The apparatus of claim 12 wherein the extension conveyor lift structure comprises at least one extension actuator extendable to pivot the conveyor support frame away from the deployable frame and move the extension conveyor to the raised position, the at least one extension actuator being retractable to pivot the conveyor support frame toward the deployable frame and move the extension conveyor to the lowered position.

14. The apparatus of claim 1 wherein the conveyor extension assembly includes a chute mounted on the extension conveyor to extend downward from the extension conveyor and receive aggregate from the outlet of the extension conveyor.

15. The apparatus of claim 1 wherein the base assembly includes an outrigger structure mounted on the base frame, the outrigger structure being movable with respect to the base frame between a stabilizing condition corresponding to an operational configuration of the apparatus and a non-stabilizing condition corresponding to a transport configuration of the apparatus.

16. The apparatus of claim 1 wherein the unloader structure includes a pair of ramps and a grate mounted on the base frame, the grate being positioned between the pair of ramps, at least a portion of the grate being reticulated to permit aggregate to pass through the grate and fall onto the base conveyor.

17. The apparatus of claim 16 wherein each of the ramps of the unloader structure is pivotable with respect to the base frame, the ramps extending laterally in substantially horizontal and opposite directions from the base frame in the operational condition of the apparatus, the ramps extending substantially vertical and parallel to each other in the transport condition of the apparatus.

18. An aggregate transferring apparatus for elevating and transferring aggregate to elevated locations above a ground surface, the apparatus comprising:
a base assembly configured to receive aggregate to be conveyed by the transferring apparatus, the base assembly including:
an elongated base frame; and
a base conveyor extending longitudinally of the base frame;
an aggregate elevating assembly configured to elevate aggregate from the base conveyor of the base assembly, the aggregate elevating assembly including:
a deployable frame mounted on the base frame and being movable between a storage position and a deploy position; and an elevating conveyor mounted on the deployable frame and configured to receive aggregate from the base conveyor and convey the aggregate upwardly from the base assembly toward a free end of the deployable frame; and a conveyor extension assembly configured to convey aggregate to locations elevated from the ground surface and horizontally outward from the aggregate elevating assembly, the conveyor extension assembly comprising:

an extension conveyor mounted on the deployable frame for moving aggregate from an inlet of the extension conveyor at the aggregate elevating assembly to an outlet of the extension conveyor at a location outward from the elevating assembly, the extension conveyor being pivotable with respect to the aggregate elevating assembly about a substantially vertical axis when the deployable frame is in the deployed position; and wherein the extension conveyor includes an inboard segment and an outboard segment, the extension conveyor being articulated between the inlet and outlet such that the inboard and outboard segments pivot about substantially vertical axes in a substantially horizontal operational plane to permit adjustment of a position of the outlet of the extension conveyor with respect to the aggregate elevating assembly.

19. The apparatus of claim 18 wherein the inboard segment of the extension conveyor is pivotable with respect to the aggregate elevating assembly at an inboard pivot, the outboard segment of the extension conveyor being pivotable with respect to the inboard segment at an outboard pivot spaced from the elevating assembly by the inboard segment.

20. The apparatus of claim 19 wherein the outboard pivot of the extension conveyor is configured to permit transfer of aggregate from the inboard segment to the outboard segment through the outboard pivot.

21. An aggregate transferring apparatus for elevating and transferring aggregate to elevated locations above a ground surface, the apparatus comprising:

a base assembly configured to receive aggregate to be conveyed by the transferring apparatus, the base assembly including:
an elongated base frame; and
a base conveyor extending longitudinally of the base frame;

an aggregate elevating assembly configured to elevate aggregate from the base conveyor of the base assembly, the aggregate elevating assembly including:
a deployable frame mounted on the base frame and being movable between a storage position and a deploy position; and
an elevating conveyor mounted on the deployable frame and configured to receive aggregate from the base conveyor and convey the aggregate upwardly from the base assembly toward a free end of the deployable frame; and a conveyor extension assembly configured to convey aggregate to locations elevated from the ground surface and horizontally outward from the aggregate elevating assembly, the conveyor extension assembly comprising:
an extension conveyor mounted on the deployable frame for moving aggregate from an inlet of the extension conveyor at the aggregate elevating assembly to an outlet of the extension conveyor at a location outward from the elevating assembly, the extension conveyor being pivotable with respect to the aggregate elevating assembly about a substantially vertical axis when the deployable frame is in the deployed position; and
wherein the extension conveyor includes an inboard segment and an outboard segment, the extension conveyor being articulated between the inlet and outlet such that the inboard and outboard segments pivot about substantially vertical axes in a substantially horizontal operational plane to permit adjustment of a position of the outlet of the extension conveyor with respect to the aggregate elevating assembly; and
wherein the extension conveyor is movable with respect to the aggregate elevating assembly between a lowered position of a transport configuration and a raised position of an operational configuration about a substantially horizontal axis in a substantially vertical plane.

22. The apparatus of claim 21 wherein the conveyor extension assembly is configured to maintain the extension conveyor in a substantially horizontal orientation as the deployable frame of the aggregate elevating assembly is moved between the storage position and the deploy position.

* * * * *